US011932015B2

(12) United States Patent
Nakano et al.

(10) Patent No.: US 11,932,015 B2

(45) Date of Patent: Mar. 19, 2024

(54) PRINT HEAD

(71) Applicant: SEIKO EPSON CORPORATION, Tokyo (JP)

(72) Inventors: Shuichi Nakano, Nagano (JP); Masahiro Toki, Nagano (JP); Tatsuya Sato, Nagano (JP); Shunsuke Kasai, Minowa-machi (JP)

(73) Assignee: Seiko Epson Corporation, Tokyo (JP)

(*) Notice: Subject to any disclaimer, the term of this patent is extended or adjusted under 35 U.S.C. 154(b) by 156 days.

(21) Appl. No.: 17/516,761

(22) Filed: Nov. 2, 2021

(65) Prior Publication Data

US 2022/0134741 A1 May 5, 2022

(30) Foreign Application Priority Data

Nov. 4, 2020 (JP) ................................ 2020-184331

(51) Int. Cl.

*B41J 2/045* (2006.01)

*B41J 2/14* (2006.01)

(52) U.S. Cl.

CPC ......... *B41J 2/04581* (2013.01); *B41J 2/0451* (2013.01); *B41J 2/14201* (2013.01)

(58) Field of Classification Search

CPC ...................................................... B41J 2/0451

See application file for complete search history.

(56) References Cited

U.S. PATENT DOCUMENTS 5,646,654 A * 7/1997 Widder .................... B41J 2/175 347/14
6,412,926 B1 * 7/2002 Okuda .................. B41J 2/1632 347/70
6,587,038 B2 * 7/2003 Cheng ...................... B41J 29/46 340/384.1
2003/0103096 A1 * 6/2003 Sayama ............... B41J 2/04593 347/9
2004/0001123 A1 * 1/2004 Yamaguchi .......... B41J 2/04581 347/70
2007/0079710 A1 * 4/2007 Ishizaki ................. H04R 17/00 101/353
2014/0210884 A1 * 7/2014 Rosario ................ B41J 2/04506 347/10
2019/0009531 A1 * 1/2019 Furukawa ............ B41J 2/04593

FOREIGN PATENT DOCUMENTS

JP 63027264 A * 2/1988 .............. B41J 29/46
JP 2017-114049 A 6/2017

* cited by examiner

*Primary Examiner* — Shelby L Fidler

(74) *Attorney, Agent, or Firm* — Global IP Counselors, LLP

(57) ABSTRACT

A print head includes a generation portion that amplifies an input signal to generate a drive signal, an ejection portion that includes a first driving element driven by a drive signal, and ejects a liquid in response to the drive of the first driving element, a supply portion that includes a first switch for switching between supply and non-supply of the drive signal to the first driving element, and a sound emitting portion that includes a second driving element driven by the drive signal, and a second switch for switching between supply and non-supply of the drive signal to the second driving element, and emits sound in response to the drive of the second driving element, in which the first switch and the second switch are turned on exclusively.

5 Claims, 14 Drawing Sheets

FIG. 10

| Sd[m] | D[m] | Qa[m] | | Qb[m] | | | Qs[m] | | |
|---|---|---|---|---|---|---|---|---|---|
| | | TQ1 | TQ2 | TT1 | TT2 | TT3 | TT1 | TT2 | TT3 |
| 1 | DP-1 | H | H | L | L | L | L | L | L |
| 2 | DP-2 | H | L | L | L | L | L | L | L |
| 3 | DP-3 | L | H | L | L | L | L | L | L |
| 4 | DP-B | L | L | L | L | L | L | L | L |
| 5 | DS | L | L | H | L | H | L | H | L |

FIG. 11

| VM | NTC | BX |
|---|---|---|
| VMth ≤ VM[m] | NTC[m] < Tth-L | 2: EJECTION ABNORMALITY (AIR BUBBLES) |
| | Tth-L ≤ NTC[m] ≤ Tth-H | 1: NORMAL |
| | Tth-H < NTC[m] | 3: EJECTION ABNORMALITY (FOREIGN MATTER AND VISCOSITY) |
| VM[m] < VMth | NTC[m] < Tth-L | 4: FAILURE |
| | Tth-L ≤ NTC[m] ≤ Tth-H | 4: FAILURE |
| | Tth-H < NTC[m] | 4: FAILURE |

PRINT HEAD

The present application is based on, and claims priority from JP Application Serial Number 2020-184331, filed Nov. 4, 2020, the disclosure of which is hereby incorporated by reference herein in its entirety.

BACKGROUND

1. Technical Field

The present disclosure relates to a print head.

2. Related Art

A printing device such as an ink jet printer executes a printing process of ejecting a liquid such as ink with which a print head is filled and forming an image on a medium such as recording paper by driving the print head with a drive signal. In the printing device, the image quality of the image formed on the medium in the printing process deteriorates when a defect occurs in the print head. Therefore, in the related art, technique related to an inspection circuit has been presented for acquiring information indicating a state of a print head from the print head, inspecting the state of the print head based on the acquired information, and outputting an inspection result signal, which is an electric signal indicating an inspection result (for example, JP-A-2017-114049).

However, in the technique in the related art, a notification device for notifying a user of the printing device of the inspection result of the state of the print head is provided outside the print head. Therefore, in the technique in the related art, a case exists where the notification device cannot acquire the inspection result of the state of the print head. As a result, in the technique in the related art, there is a possibility of not being notified of the inspection result of the print head.

SUMMARY

According to an aspect of the present disclosure, there is provided a printer head including a generation portion that amplifies an input signal to generate a drive signal, an ejection portion that includes a first driving element driven by a drive signal, and ejects a liquid in response to the drive of the first driving element, a supply portion that includes a first switch for switching between supply and non-supply of the drive signal to the first driving element, and a sound emitting portion that includes a second driving element driven by the drive signal, and a second switch for switching between supply and non-supply of the drive signal to the second driving element, and emits sound in response to the drive of the second driving element, in which the first switch and the second switch are turned on exclusively.

BRIEF DESCRIPTION OF THE DRAWINGS

FIG. 10 is an explanatory diagram showing an example of an individual specifying signal.

FIG. 11 is an explanatory diagram for describing an example of an operation of an ejection determination circuit.

DESCRIPTION OF EXEMPLARY EMBODIMENTS

Hereinafter, embodiments for carrying out the present disclosure will be described with reference to the drawings. However, in each drawing, the dimensions and scale of each part are appropriately different from the actual ones. Further, since embodiments described below are preferred specific examples of the present disclosure, various technically preferable limitations are added; however, the scope of the present disclosure is not limited to these forms unless otherwise stated to limit the present disclosure in the following description.

1. First Embodiment

In the present embodiment, a printing device will be described by exemplifying an ink jet printer that ejects ink to form an image on a recording paper P. In the present embodiment, ink is an example of a "liquid", and the recording paper P is an example of a "medium".

1.1. Overview of Ink Jet Printer Functions

Hereinafter, an example of a functional configuration of an ink jet printer 1 according to the present embodiment will be described with reference to FIG. 1.

Figure 1:
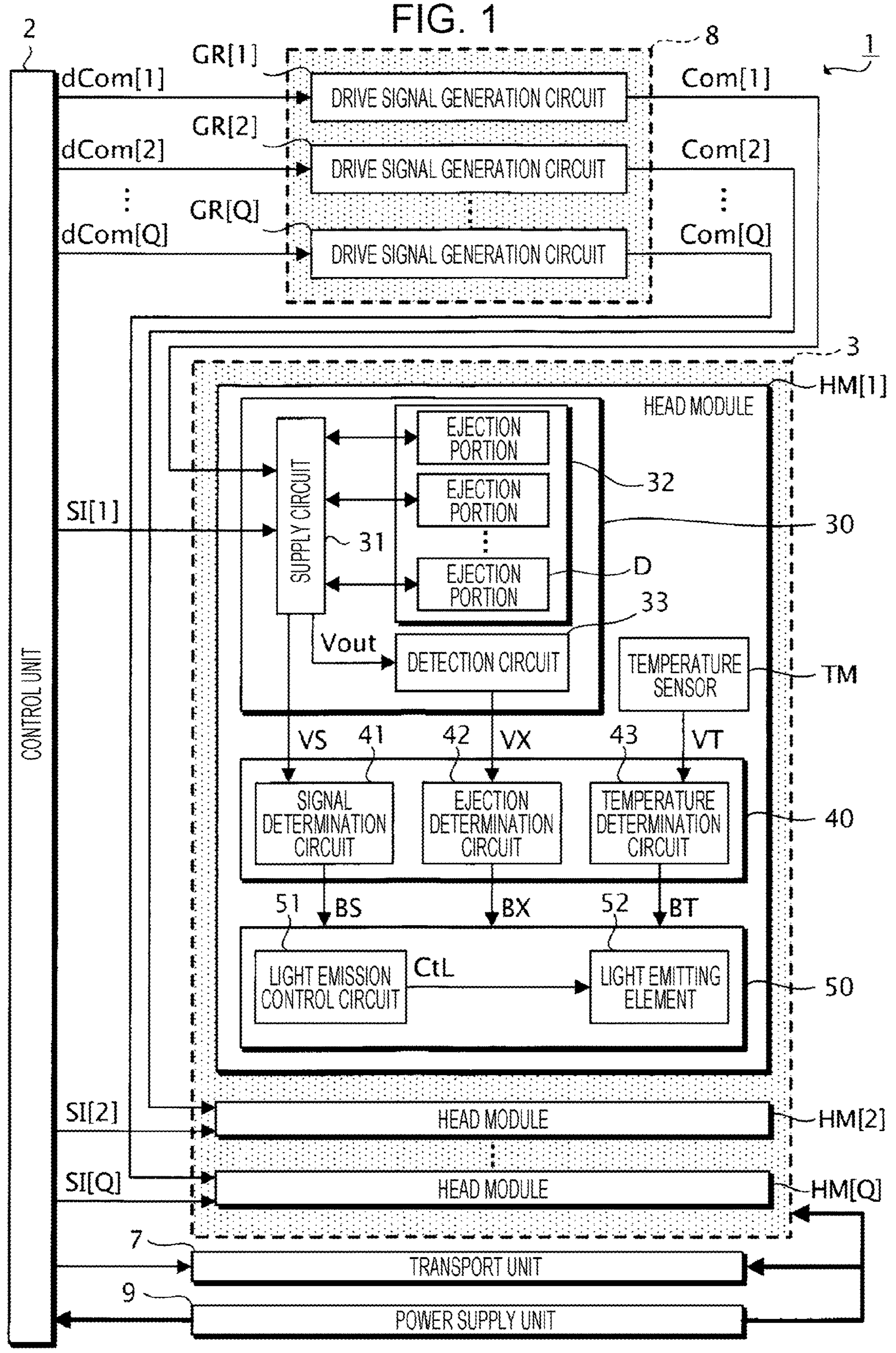
FIG. 1 is a block diagram showing an example of a configuration of an ink jet printer according to a first embodiment of the present disclosure.

FIG. 1 is a functional block diagram showing an example of a configuration of the ink jet printer 1. The ink jet printer 1 is supplied with print data Img indicating an image to be formed by the ink jet printer 1 from a host computer such as a personal computer or a digital camera. The ink jet printer 1 executes a printing process, which is a process of forming an image indicated by the print data Img supplied from the host computer on the recording paper P.

As illustrated in FIG. 1, the ink jet printer 1 includes a control unit 2 that controls each part of the ink jet printer 1, a head unit 3 provided with an ejection portion D that ejects ink, a drive signal generation unit 8 that generates a drive signal Com for driving the ejection portion D, a transport unit 7 for changing a relative position of the recording paper P with respect to the head unit 3, a power supply unit 9 that supplies power to each part of the ink jet printer 1. In the present embodiment, the head unit 3 is an example of a "print head".

As illustrated in FIG. 1, the head unit 3 includes Q head modules HM. Here, the value Q is a natural number, and "Q≥1" is satisfied. In the following, the q-th head module HM among the Q head modules HM may be referred to as a head module HM[q]. Here, the variable q is a natural number and "1≤q≤Q" is satisfied. Further, in the following, when a component, signal, or the like of the ink jet printer 1 corresponds to the head module HM[q] among the Q head modules HM, a subscript[q] may be added to a code for representing the component, signal, or the like. In the present embodiment, the case of "Q=4" will be illustrated as an example.

In the present embodiment, each head module HM includes M ejection portions D. Here, the value M is a natural number, and "M≥1" is satisfied. In the following, among the M ejection portions D provided in the head module HM, the m-th ejection portion D may be referred to as an ejection portion D[m]. Here, the variable m is a natural number and "1≤m≤M" is satisfied. Further, in the following, when a component, signal, or the like of the ink jet printer 1 corresponds to the ejection portion D[m] among the M ejection portions D, a subscript[m] may be added to a code for representing the component, signal, or the like.

The control unit 2 includes one or a plurality of CPUs. However, the control unit 2 may include a programmable logic device such as an FPGA, in place of the CPU or in addition to the CPU. Here, CPU is an abbreviation for central processing unit, and FPGA is an abbreviation for field-programmable gate array. The control unit 2 generates signals for controlling the operation of each part of the ink jet printer 1, such as a print signal SI and a waveform specifying signal dCom.

Here, the waveform specifying signal dCom is a digital signal that defines the waveform of the drive signal Com. In addition, the drive signal Com is an analog signal for driving the ejection portions D. The print signal SI is a digital signal for specifying the type of operation of the ejection portions D. Specifically, the print signal SI is a signal that specifies the type of operation of the ejection portions D by specifying whether or not to supply the drive signal Com to the ejection portions D.

In the present embodiment, the control unit 2 supplies the print signal SI for each head module HM. That is, the control unit 2 supplies a print signal SI[q] to the head module HM[q].

In the present embodiment, the drive signal generation unit 8 includes Q drive signal generation circuits GR corresponding to the head modules HM[1] to HM[Q] in a one-to-one relationship. A drive signal generation circuit GR[q] generates a drive signal Com[q] for driving the ejection portion D provided in the head module HM[q]. The drive signal generation circuit GR[q] is an example of a "generation portion".

In the present embodiment, it is assumed that the drive signal Com[q] includes a drive signal Com-A[q] and a drive signal Com-B[q]. In the following, the drive signal Com-A[q] and the drive signal Com-B[q] may be collectively referred to as a drive signal Com-P[q].

Further, in the present embodiment, it is assumed that the drive signal generation circuit GR[q] includes a drive signal generation circuit GR-A[q] that generates the drive signal Com-A[q] and a drive signal generation circuit GR-B[q] that generates the drive signal Com-B[q]. In the following, the drive signal generation circuit GR-A[q] and the drive signal generation circuit GR-B[q] may be collectively referred to as a drive signal generation circuit GR-P[q].

Further, in the present embodiment, it is assumed that a waveform specifying signal dCom[q] includes a waveform specifying signal dCom-A[q] that defines the waveform of the drive signal Com-A[q] and a waveform specifying signal dCom-B[q] that defines the waveform of the drive signal Com-B[q]. In the following, the waveform specifying signal dCom-A[q] and the waveform specifying signal dCom-B[q] may be collectively referred to as a waveform specifying signal dCom-P[q].

The drive signal generation circuit GR-P[q] includes a DA conversion circuit to generate the drive signal Com-P[q] having a waveform defined by the waveform specifying signal dCom-P[q] based on the waveform specifying signal dCom-P[q].

When the printing process is executed, the control unit 2 first generates a signal for controlling the head unit 3, such as a print signal SI, a signal for controlling the drive signal generation unit 8 such as the waveform specifying signal dCom, and a signal for controlling transport unit 7, based on various data, such as print data Img, supplied from a host computer. Then, in the printing process, the control unit 2 controls the transport unit 7 to change the relative position of the recording paper P with respect to the head unit 3 and controls the drive signal generation unit 8 and the head unit 3 to drive the ejection portion D based on various signals such as the print signal SI while. In this way, in the printing process, the control unit 2 controls each part of the ink jet printer 1 to form an image corresponding to the print data IMG on the recording paper P, by adjusting the presence/absence of ink ejection from the ejection portion D, the amount of ink ejected, the ink ejection timing, and the like.

As illustrated in FIG. 1, the head module HM[q] includes a printing section 30, a determination portion 40, a light emitting portion 50, and a temperature sensor TM.

Among them, the printing section 30 includes a supply circuit 31, an ejection head 32, and a detection circuit 33. The ejection head 32 is an example of a "head portion".

The supply circuit 31 switches between supply and non-supply of the drive signal Com[q] to the ejection portion D[m], based on the print signal SI[q]. In the following, among the drive signals Com[q], the drive signal Com[q] supplied to the ejection portion D[m] may be referred to as a supply drive signal Vin[m]. Further, the supply circuit 31 switches between supply and non-supply of a detection potential signal Vout[m] indicating the potential of an upper electrode Zu[m] of a piezoelectric element PZ[m] included in the ejection portion D[m] to the detection circuit 33, based on the print signal SI[q]. In the following, when the detection potential signal Vout[m] is supplied from the ejection portion D[m] to the detection circuit 33, the ejection portion D[m] is referred to as an inspection target ejection portion DS. When the ejection portion D[m] does not correspond to the inspection target ejection portion DS, the ejection portion D[m] is referred to as a non-inspection target ejection portion DP. The piezoelectric element PZ[m] and the upper electrode Zu[m] will be described later in FIG. 4.

Further, the supply circuit 31 outputs a supply signal VS including various signals acquired from the control unit 2 to the determination portion 40. Here, the supply signal VS is a signal including the print signal SI[q], a clock signal CL, a latch signal LAT, a change signal CH, and a period specifying signal Tsig. The clock signal CL, the latch signal LAT, the change signal CH, and the period specifying signal Tsig will be described later.

The detection circuit 33 generates a detection signal VX[m] based on the detection potential signal Vout[m] supplied from the inspection target ejection portion DS through the supply circuit 31. Specifically, the detection circuit 33 generates the detection signal VX[m] by, for example, amplifying the detection potential signal Vout[m] and removing a noise component.

The temperature sensor TM detects the temperature of the head module HM[q] and generates a temperature signal VT indicating the result of the detection.

The determination portion 40 includes a signal determination circuit 41, an ejection determination circuit 42, and a temperature determination circuit 43.

The signal determination circuit 41 determines, based on the supply signal VS, whether or not various signals are normally supplied from the control unit 2 to the head unit 3, that is, whether or not there is no signal supply abnormality related to the supply of various signals from the control unit 2 to the head unit 3, and outputs signal determination result information BS indicating the result of the determination. Here, the signal supply abnormality is a general term for a state in which various signals cannot be supplied from the control unit 2 to the head unit 3 due to a disconnection in a wire that electrically couples the control unit 2 to the head unit 3, and a state in which information indicated by various signals supplied from the control unit 2 to the head unit 3 is not accurate due to superimposition of noise on various signals supplied from the control unit 2 to the head unit 3.

The ejection determination circuit 42 determines whether or not the ink ejection state in the inspection target ejection portion DS is normal, that is, whether or not there is no ejection abnormality in the inspection target ejection portion DS, based on the detection signal VX, and outputs ejection determination result information BX indicating the result of the determination. Here, the ejection abnormality is a general term for a state in which the ink ejection in the ejection portion D is abnormal, that is, a state in which ink cannot be accurately ejected from the nozzle N included in the ejection portion D. For example, an ejection abnormality includes a state in which ink cannot be ejected from the ejection portion D, a state in which the ejection portion D ejects an amount of ink different from the ink ejection amount defined by the drive signal Com, a state in which the ejection portion D ejects ink at a speed different from the ink ejection speed defined by the drive signal Com, or the like.

The temperature determination circuit 43 determines whether or not the temperature of the head module HM[q] is normal, that is, whether or not a temperature abnormality does not occur in the head module HM[q], based on the temperature signal VT, and outputs temperature determination result information BT indicating the result of the determination. Here, the temperature abnormality means that the temperature of the head module HM[q] is equal to or higher than the reference temperature.

In the following, information including the signal determination result information BS, the ejection determination result information BX, and the temperature determination result information BT may be referred to as determination result information BB.

The light emitting portion 50 includes a light emission control circuit 51 and one or more light emitting elements 52. In the present embodiment, as an example, it is assumed that the light emitting portion 50 includes two light emitting elements 52.

The light emitting elements 52 is, for example, light emitting diodes. In the present embodiment, the light emitting elements 52 can emit visible light having a wavelength of 570 nm or more. For example, the light emitting elements 52 may be capable of emitting red light or orange light. In the present embodiment, it is assumed that any kind of ink can be employed as the ink to be used in the ink jet printer 1. For example, as the ink to be used in the ink jet printer 1, an ultraviolet curable ink that cures when irradiated with an ultraviolet ray may be employed. Further, as the ink to be used in the ink jet printer 1, an ink containing a disazo-based color material having weak light resistance may be employed.

The light emission control circuit 51 generates a light emission control signal CtL for causing one or both of the two light emitting elements 52 to emit light based on the determination result information BB.

1.2. Structure of Ink Jet Printer

Hereinafter, an example of the structure of the ink jet printer 1 will be described with reference to FIGS. 2 to 5.

Figure 2:
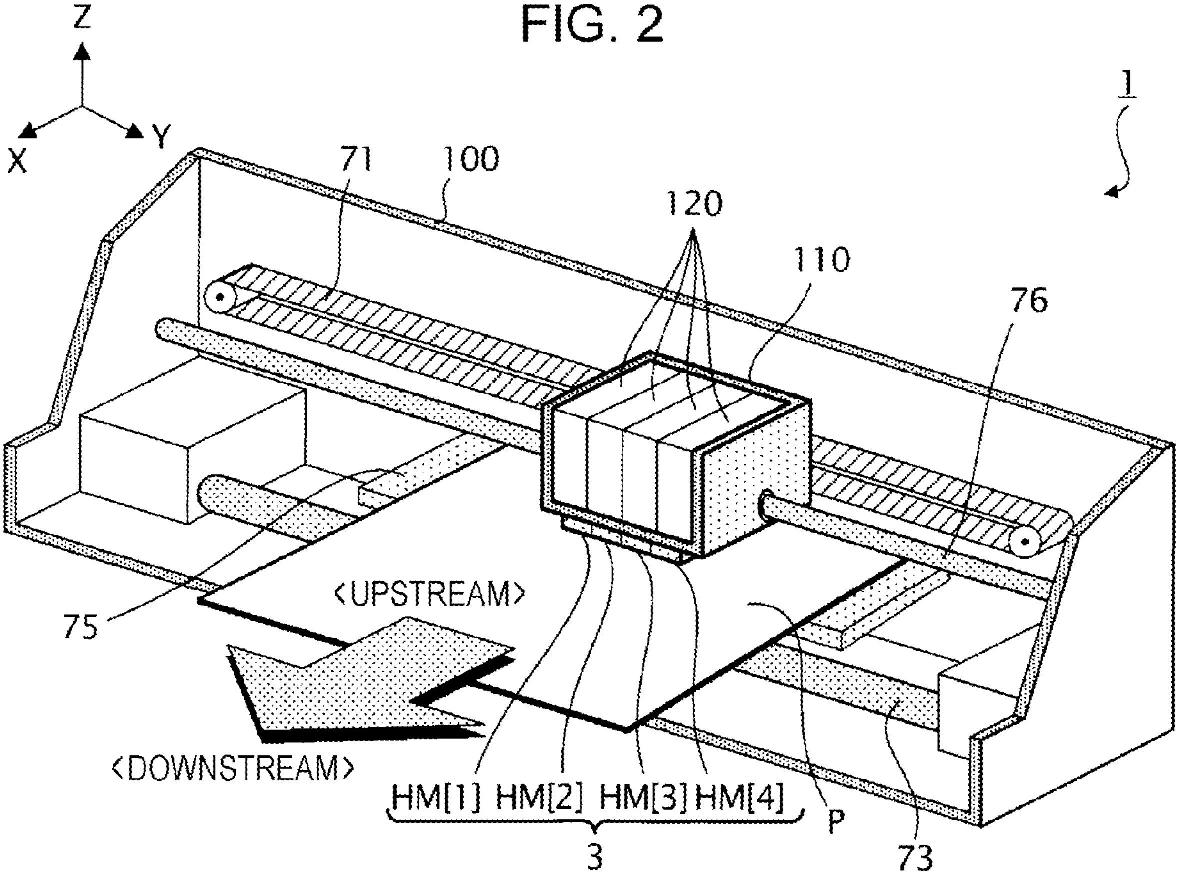
FIG. 2 is a perspective view showing an example of a schematic internal structure of the ink jet printer.

FIG. 2 is a perspective view showing an example of a schematic internal structure of the ink jet printer 1.

As illustrated in FIG. 2, in the present embodiment, it is assumed that the ink jet printer 1 is a serial printer. Specifically, when executing the printing process, the ink jet printer 1 forms dots corresponding to the print data Img on the recording paper P by ejecting ink from the ejection portion D while transporting the recording paper in a sub-scanning direction and reciprocating the head unit 3 in a main scanning direction intersecting the sub-scanning direction.

In the following, a +X direction and the opposite direction, a −X direction, are collectively referred to as an "X-axis direction", a +Y direction intersecting the X-axis direction and the opposite direction, a −Y direction, are collectively referred to as a "Y-axis direction", and a +Z direction intersecting the X-axis direction and the Y-axis direction and the opposite direction, a −Z direction are collectively referred to as a "Z-axis direction". Then, in the present embodiment, as illustrated in FIG. 2, the +X direction from the −X side as upstream to the +X side as downstream is defined as the sub-scanning direction, and the +Y direction and the −Y direction are defined as the main scanning direction.

As illustrated in FIG. 2, the ink jet printer 1 according to the present embodiment includes a housing 100 and a carriage 110 capable of reciprocating in the housing 100 in the Y-axis direction and mounting the head unit 3.

In the present embodiment, as illustrated in FIG. 2, it is assumed that the carriage 110 stores four ink cartridges 120 corresponding to four color inks of cyan, magenta, yellow, and black in a one-to-one relationship. Further, as described above, in the present embodiment, as an example, it is assumed that the ink jet printer 1 includes four head modules HM corresponding to four ink cartridges 120 in a one-to-one relationship. Each ejection portion D receives ink from the ink cartridge 120 corresponding to the head module HM provided with the ejection portion D. In this way, each ejection portion D can fill the inside with the supplied ink, and the filled ink can be ejected from the nozzle N provided in the ejection portion D. Furthermore, the ink cartridge 120 may be provided outside the carriage 110.

Further, as described above, the ink jet printer 1 according to the present embodiment includes the transport unit 7. When the printing process is executed, the transport unit 7 reciprocates the carriage 110 in the Y-axis direction and transports the recording paper P in the +X direction to change the relative position of the recording paper P with respect to the head unit 3, thereby making it possible for the ink to land on the entire recording paper P. The transport unit 7 includes a carriage guide shaft 76 supporting the carriage 110 such that it can reciprocate in the Y-axis direction, and a transport mechanism 71 for reciprocating the carriage 110 in the Y-axis direction. Therefore, the transport unit 7 can reciprocate the head unit 3 together with the carriage 110 in the Y-axis direction along the carriage guide shaft 76. Further, the transport unit 7 includes a platen 75 provided on the −Z side of the carriage 110, and a transport mechanism 73 that transports the recording paper P on the platen 75 in the +X direction.

Figure 3:
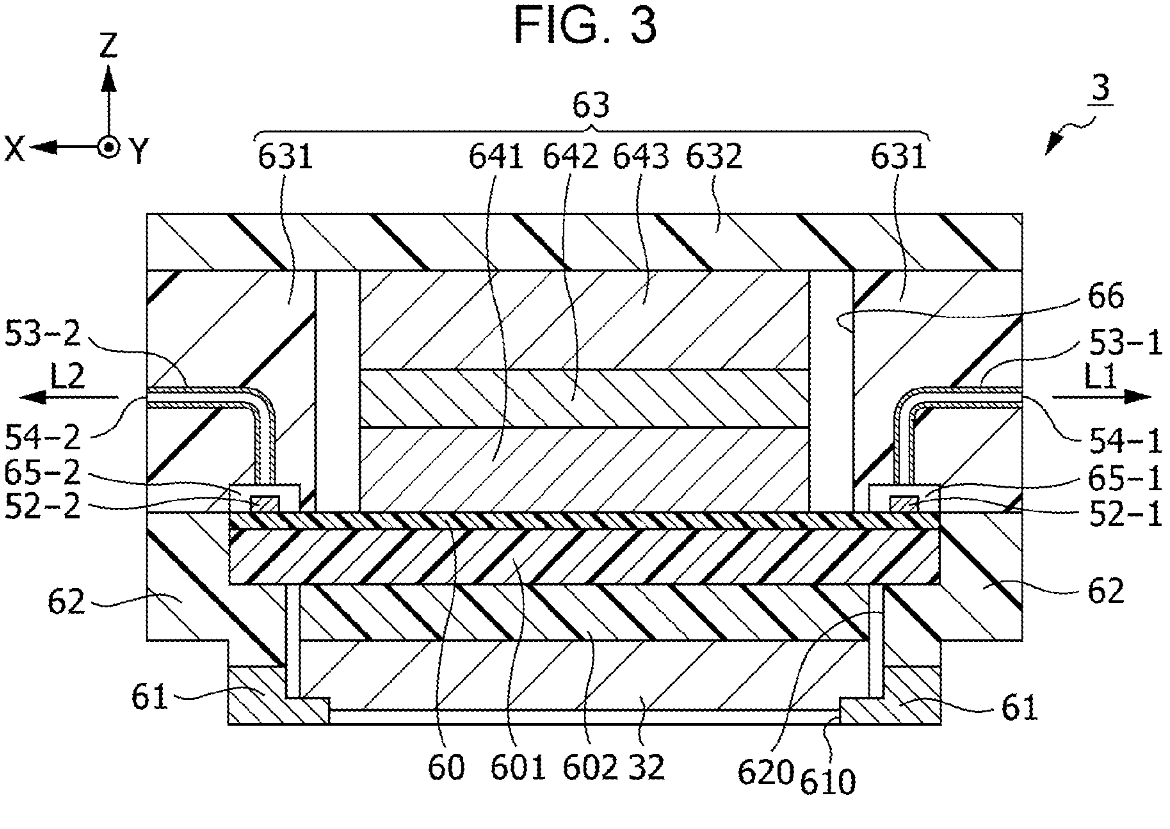
FIG. 3 is a cross-sectional view showing an example of a schematic structure of a head unit.

FIG. 3 is an example of a schematic partial cross-sectional view of the head unit 3 where the head unit 3 is cut in a plane parallel to the XZ plane.

As illustrated in FIG. 3, the head unit 3 includes a fixed plate 61 for fixing the ejection head 32, a lower frame portion 62 for accommodating the ejection head 32, a flow path member 63 provided with a flow path for supplying ink from the ink cartridge 120 to the ejection head 32, a circuit board 60 on which various circuits such as the supply circuit 31, the detection circuit 33, the signal determination circuit 41, the ejection determination circuit 42, the temperature determination circuit 43, and the light emission control circuit 51 are formed, and the two light emitting elements 52 described above.

The fixed plate 61 is, for example, a flat plate material made of a highly rigid metal, and has an opening 610 formed therein. The ejection heads 32 included in the head module HM[q] are fixed to the fixed plate 61 such that the M nozzles N included in the M ejection portions D[1] to D[M] provided on the ejection head 32 can be visually recognized from the opening 610 when viewed in the +Z direction.

The lower frame portion 62 is fixed to the fixed plate 61 on the +Z side of the fixed plate 61, for example, with an adhesive or the like. The lower frame portion 62 is, for example, a structure made of a resin material, and has an opening 620 formed therein. A coupling portion 601 and a support portion 602 are provided inside the opening 620.

The support portion 602 is a structure for supporting the ejection head 32. The support portion 602 is formed of, for example, a resin material. The support portion 602 is provided with a flow path for supplying ink from the ink cartridge 120 to the ejection head 32. The ejection head 32 is fixed to the support portion 602 to the −Z side of the support portion 602, for example, with an adhesive or the like.

The coupling portion 601 is fixed to the support portion 602 on the +Z side of the support portion 602, for example, with an adhesive or the like. The coupling portion 601 is made of, for example, a resin material. The coupling portion 601 is provided with a flow path for supplying ink from the ink cartridge 120 to the ejection head 32.

The circuit board 60 is fixed to the coupling portion 601 on the +Z side of the coupling portion 601 with, for example, an adhesive or the like. The circuit board 60 is made of, for example, a glass epoxy resin. As described above, the supply circuit 31, the detection circuit 33, the signal determination circuit 41, the ejection determination circuit 42, the temperature determination circuit 43, and the light emission control circuit 51 are formed on the +Z side of the circuit board 60. Further, two light emitting elements 52 are formed on the +Z side of the circuit board 60 and at the ends of the circuit board 60 in the Y-axis direction. Specifically, a light emitting element 52-1 is formed on the +Z side of the circuit board 60 and at the end of the circuit board 60 in the −X direction. Further, a light emitting element 52-2 is formed on the +Z side of the circuit board 60 and at the end of the circuit board 60 in the +X direction.

The flow path member 63 is a structure made of, for example, a resin material such as plastic, and includes an outer frame portion 631, an upper frame portion 632, a communication portion 641, a filter portion 642, and a valve portion 643.

The outer frame portion 631 is fixed to the lower frame portion 62 and the circuit board 60 on the +Z side of the lower frame portion 62 and the circuit board 60, for example, with an adhesive or the like. The outer frame portion 631 is provided with an opening 66 penetrating the outer frame portion 631 in the Z-axis direction and two recesses 65 on the surface on the −Z side of the outer frame portion 631. Specifically, on the surface on the −Z side of the outer frame portion 631, a recess 65-1 is provided on the −X side of the opening 66, and on the surface on the −Z side of the outer frame portion 631, a recess 65-2 is provided on the +X side of the opening 66.

The communication portion 641 is fixed to the circuit board 60 on the +Z side of the circuit board 60. The communication portion 641 is provided with a flow path for supplying ink from the ink cartridge 120 to the ejection head 32.

The filter portion 642 is fixed to the communication portion 641 on the +Z side of the communication portion 641 with, for example, an adhesive or the like. The filter portion 642 is provided with a flow path for supplying ink from the ink cartridge 120 to the ejection head 32. Although not shown, the filter portion 642 is provided with a filter for removing air bubbles and foreign matter from the ink flowing through the flow path provided in the filter portion 642.

The valve portion 643 is fixed to the filter portion 642 on the +Z side of the filter portion 642, for example, with an adhesive or the like. The valve portion 643 is provided with a flow path for supplying ink from the ink cartridge 120 to the ejection head 32. Further, although not shown, the valve portion 643 is provided with an adjusting valve for adjusting the pressure of the ink supplied from the ink cartridge 120.

The upper frame portion 632 is fixed to the outer frame portion 631 and the valve portion 643 on the +Z side of the outer frame portion 631 and the valve portion 643, for example, with an adhesive or the like. The upper frame portion 632 is provided with a flow path for supplying ink from the ink cartridge 120 to the ejection head 32.

The two light emitting elements 52 are fixed to the circuit board 60 on the +Z side of the circuit board 60. Specifically, the two light emitting elements 52 are provided on the surface on the +Z side of the circuit board 60, and inside the recess 65 at the ends of the circuit board 60 in the X-axis direction.

More specifically, the light emitting element 52-1 is provided on the surface on the +Z side of the circuit board 60, and inside the recess 65-1 at the end of the circuit board 60 in the −X direction. Further, the light emitting element 52-2 is provided on the surface on the +Z side of the circuit board 60, and inside the recess 65-2 at the end of the circuit board 60 in the +X direction. That is, each of the light emitting elements 52 is provided between the outer frame portion 631 included in the flow path member 63 and the circuit board 60. The circuit board 60 is provided between the flow path member 63 and the ejection head 32.

Further, the outer frame portion 631 is provided with a light guide tube 53-1 coupling the recess 65-1 to the opening 54-1.

Here, the light guide tube 53-1 is a component that guides the light emitted by the light emitting element 52-1 to the opening 54-1. For example, the light guide tube 53-1 may be an optical fiber.

Further, the opening 54-1 is an element for emitting the light emitted from the light emitting element 52-1 and guided by the light guide tube 53-1 to the outside of the head unit 3. In the present embodiment, the opening 54-1 is provided in a portion that can be visually recognized when the outer frame portion 631 is viewed in the +X direction, but the present disclosure is not limited to such a mode. For example, the opening 54-1 may be provided in a portion that can be visually recognized when the upper frame portion 632 is viewed in the +X direction. In this case, the light guide tube 53-1 may be provided to couple the recess 65-1 to the opening 54-1 in the outer frame portion 631 and the upper frame portion 632. That is, the opening 54-1 may be provided in a side surface portion that can be visually recognized when the flow path member 63 is viewed in the +X direction. The opening 54-1 is provided so that the light emitting element 52-1 is located between the ejection head 32 and the opening 54-1 in the Z-axis direction.

In the present embodiment, the light emitted from the opening 54-1 travels in a direction L1. However, the light emitted from the opening 54-1 may travel to diffuse around the direction L1. Here, the direction L1 is a direction parallel to the −X direction when viewed in the Y-axis direction. However, the direction L1 may be a direction between the −X direction and the +Z direction when viewed in the Y-axis direction.

Further, the outer frame portion 631 is provided with a light guide tube 53-2 coupling the recess 65-2 with an opening 54-2.

Here, the light guide tube 53-2 is a component that guides the light emitted by the light emitting element 52-2 to the opening 54-2. For example, the light guide tube 53-2 may be an optical fiber.

Further, the opening 54-2 is an element for emitting the light emitted from the light emitting element 52-2 and guided by the light guide tube 53-2 to the outside of the head unit 3. In the present embodiment, the opening 54-2 is provided in a portion that can be visually recognized when the outer frame portion 631 is viewed in the −X direction, but the present disclosure is not limited to such a mode. For example, the opening 54-2 may be provided in a portion that can be visually recognized when the upper frame portion 632 is viewed in the −X direction. In this case, the light guide tube 53-2 may be provided to couple the recess 65-2 to the opening 54-2 in the outer frame portion 631 and the upper frame portion 632. That is, the opening 54-2 may be provided in a side surface portion that can be visually recognized when the flow path member 63 is viewed in the −X direction. The opening 54-2 is provided so that the light emitting element 52-2 is located between the ejection head 32 and the opening 54-2 in the Z-axis direction.

In the present embodiment, the light emitted from the opening 54-2 travels in a direction L2. However, the light emitted from the opening 54-2 may travel to diffuse around the direction L2. Here, the direction L2 is a direction parallel to the +X direction when viewed in the +X direction. However, the direction L2 may be a direction between the +X direction and the +Z direction when viewed in the Y-axis direction.

Further, in the present embodiment, the opening 54-1 and the opening 54-2 are examples of the "side surface opening".

Figure 4:
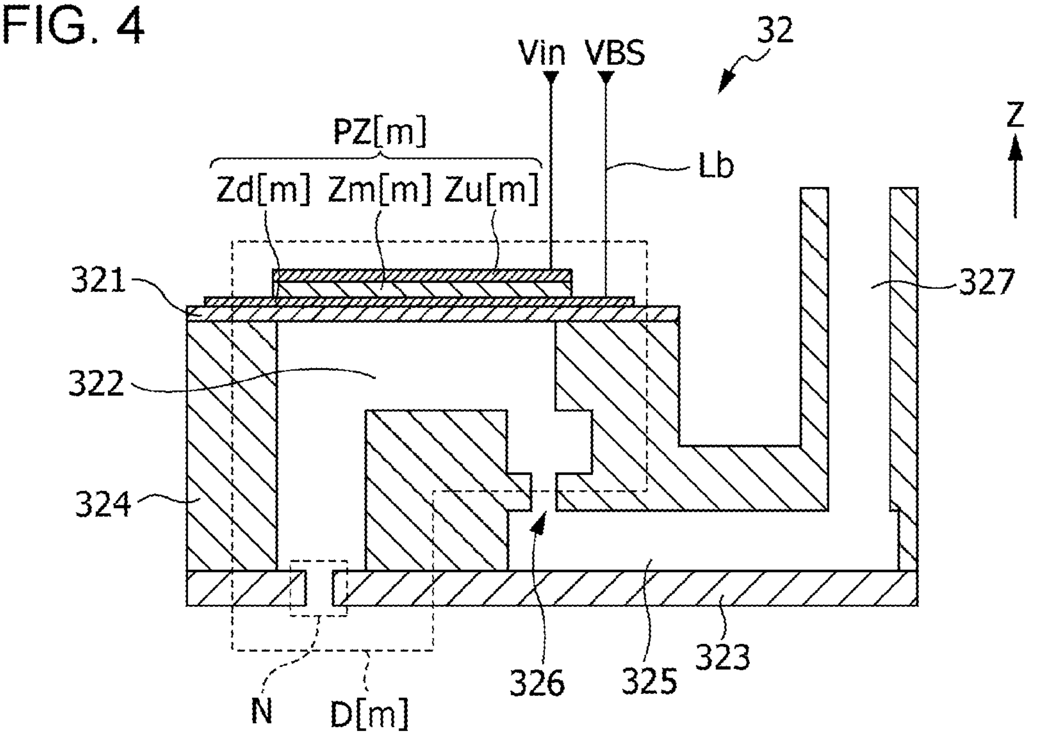
FIG. 4 is a cross-sectional view showing an example of a schematic structure of an ejection portion.

FIG. 4 is a diagram showing an example of a schematic cross-sectional view of the ejection head 32 where the ejection head 32 is cut so as to include the ejection portion D(m).

As illustrated in FIG. 4, the ejection portion D(m) includes the piezoelectric element PZ[m], a cavity 322 filled with ink therein, a nozzle N communicating with a cavity 322, and a diaphragm 321. In the present embodiment, the piezoelectric element PZ(m) is an example of a "driving element". The ejection portion D[m] ejects the ink in the cavity 322 from the nozzle N in the −Z direction by driving the piezoelectric element PZ[m] by the supply drive signal Vin[m]. The cavity 322 is a space partitioned by the cavity plate 324, a nozzle plate 323 on which the nozzle N is formed, and the diaphragm 321. The cavity 322 communicates with the reservoir 325 through an ink supply port 326. The reservoir 325 communicates with the ink cartridge 120 corresponding to the ejection portion D[m] through an ink intake port 327. The piezoelectric element PZ[m] includes the upper electrode Zu[m], a lower electrode Zd[m], and a piezoelectric body Zm[m] provided between the upper electrode Zu[m] and the lower electrode Zd[m]. The lower electrode Zd[m] is electrically coupled to a feeder line Lb set at a potential VBS. Then, when the supply drive signal Vin[m] is supplied to the upper electrode Zu[m] and a voltage is applied between the upper electrode Zu[m] and the lower electrode Zd[m], the piezoelectric element PZ[m] is displaced in the +Z direction or the −Z direction depending on the applied voltage, and as a result, the piezoelectric element PZ[m] vibrates. The lower electrode Zd[m] is joined to the diaphragm 321. Therefore, when the piezoelectric element PZ[m] is driven by the supply drive signal Vin[m] and vibrates, the diaphragm 321 also vibrates. Then, the volume of the cavity 322 and the pressure in the cavity 322 change with the vibration of the diaphragm 321, and the ink filled in the cavity 322 is ejected from the nozzle N in the −Z direction.

In the present embodiment, it is assumed that one reservoir 325 is provided in common for the M ejection portions D[1] to D[M] in the ejection head 32. In other words, in the present embodiment, the M ejection portions D[1] to D[M] provided in the ejection head 32 communicate with each other through one reservoir 325.

Figure 5:
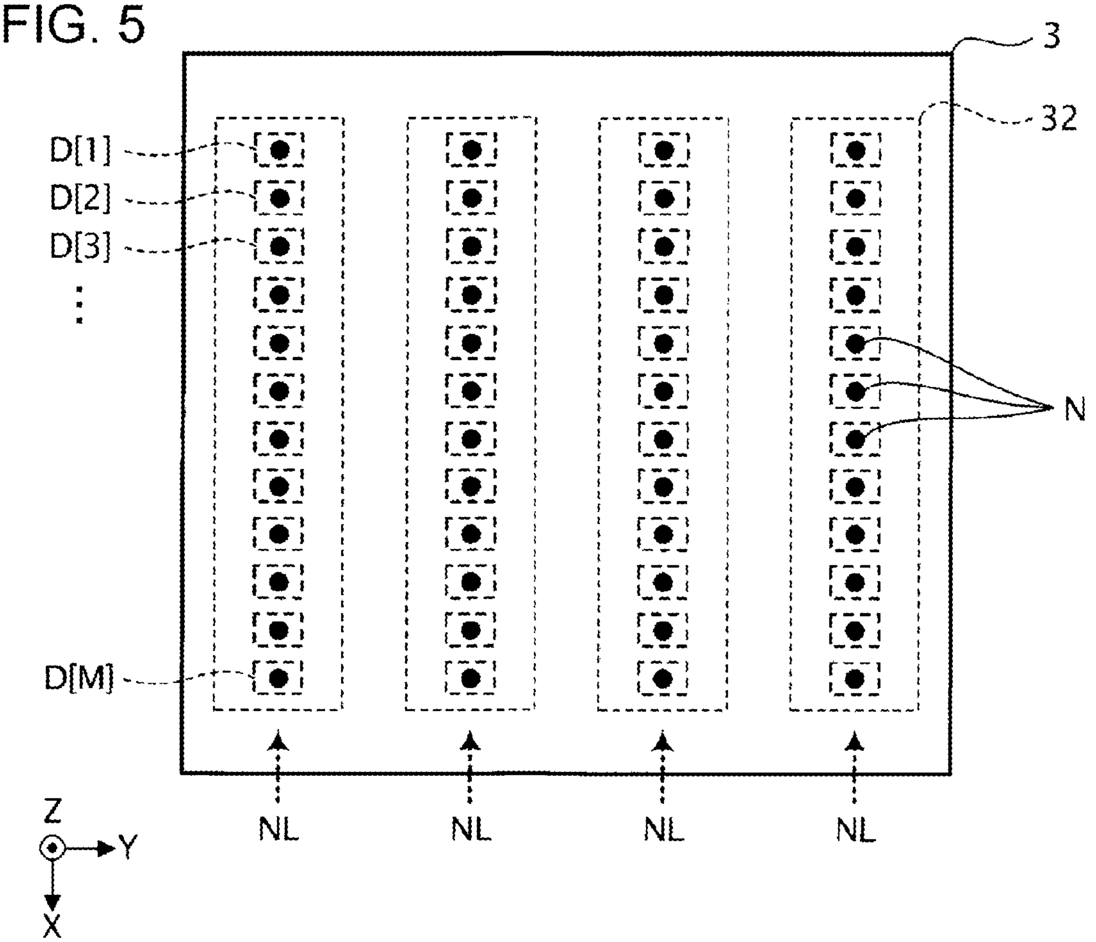
FIG. 5 is a plan view showing an example of arrangement of nozzles in the head unit.

FIG. 5 is an explanatory diagram for describing an example of arrangement of the four ejection heads 32 included in the head unit 3 and the total of 4M nozzles N provided on the four ejection heads 32, in a plan view of the head unit 3 in the +Z direction.

As illustrated in FIG. 5, each of the ejection heads 32 provided in the head unit 3 is provided with a nozzle row NL. Here, the nozzle row NL refers to a plurality of nozzles N provided to extend in a row in a predetermined direction. In the present embodiment, it is assumed as an example that each nozzle row NL is composed of M nozzles N arranged such that the nozzle row NL extends in the X-axis direction.

1.3. Drive Signal Generation Circuit

Hereinafter, an example of the drive signal generation circuit GR-P will be described with reference to FIGS. 6 and 7.

Figure 6:
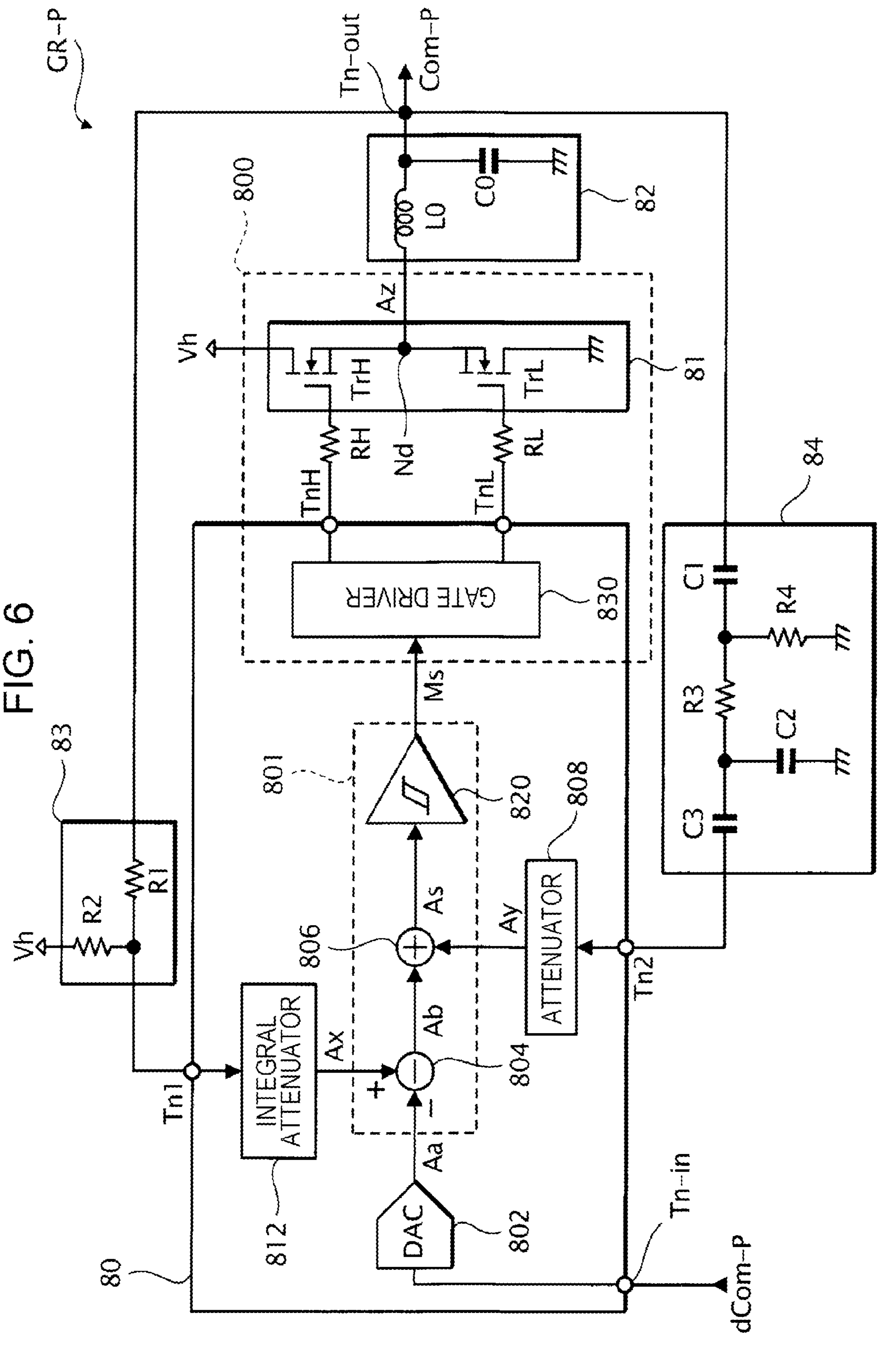
FIG. 6 is a block diagram showing an example of a configuration of a drive signal generation circuit.

FIG. 6 is a diagram showing an example of a circuit configuration of the drive signal generation circuit GR-P.

As illustrated in FIG. 6, the drive signal generation circuit GR-P generates the drive signal Com-P based on the waveform specifying signal dCom-P. As described above, the drive signal generation circuit GR-P is a general term for the drive signal generation circuit GR-A and the drive signal generation circuit GR-B, the waveform specifying signal dCom-P is a general term for the waveform specifying signal dCom-A and the waveform specifying signal dCom-B, and the drive signal Com-P is a general term for the drive signal Com-A and the drive signal Com-B.

The drive signal generation circuit GR-P first converts the digital waveform specifying signal dCom supplied from the control unit 2 into an analog input signal, next, generates a modulated signal based on the input signal, then, amplifies the modulated signal to generate an amplified signal, and finally, smooths the amplified signal to generate the drive signal Com-P.

As illustrated in FIG. 6, the drive signal generation circuit GR-P includes an LSI 80, a transistor pair 81 including transistors TrH and TrL, and various elements such as resistors and capacitors. Here, LSI is an abbreviation for large scale integration.

As illustrated in FIG. 6, the waveform specifying signal dCom-P is input from the control unit 2 to the LSI 80 through an input terminal Tn-in. The LSI 80 inputs a gate signal to each of gates of the transistors TrH and TrL based on the waveform specifying signal dCom-P. In the present embodiment, as an example, it is assumed that the transistors TrH and TrL are N-channel FETs. Here, FET is an abbreviation for field effect transistor.

As illustrated in FIG. 6, the LSI 80 includes a DAC 802, a subtractor 804, an adder 806, an attenuator 808, an integral attenuator 812, a comparator 820, and a gate driver 830. Here, DAC is an abbreviation for digital to analog converter.

The DAC 802 converts the waveform specifying signal dCom-P defining the waveform of the drive signal Com-P into an analog input signal Aa, and supplies the input signal Aa to an input end (−) of the subtractor 804. The voltage amplitude of the input signal Aa is, for example, about 0 to 2 volts, and the drive signal Com-P is obtained by amplifying the voltage about 20 times. That is, the input signal Aa is a signal of the drive signal Com-P before amplification.

The integral attenuator 812 supplies a signal Ax integrated after attenuating the drive signal Corn-P fed back through a terminal Tn1 to an input end (+) of the subtractor 804.

The subtractor 804 supplies the adder 806 with a signal Ab indicating a voltage obtained by subtracting the voltage at the input end (−) from the voltage at the input end (+).

The power supply voltage of the circuit from the DAC 802 to the comparator 820 is a low amplitude 3.3 volt. That is, the voltage of the input signal Aa is about 2 volts at the maximum. On the other hand, the voltage of the drive signal Com-P may exceed 40 volts. Therefore, in the integral attenuator 812, the voltage of the drive signal Com-P is attenuated to match the amplitude range of the signal Ax with the amplitude range of the signal in the circuit from the DAC 802 to the comparator 820.

The attenuator 808 supplies the adder 806 with a signal Ay in which the high-frequency component of the drive signal Com-P fed back through the terminal Tn2 is attenuated. The attenuation in the attenuator 808 is to match the amplitude range of the signal Ay with the amplitude range of the signal in the circuit from the DAC 802 to the comparator 820, similarly to the integral attenuator 812.

The adder 806 supplies the comparator 820 with a signal As indicating a voltage obtained by adding the voltage indicated by the signal Ab and the voltage indicated by the signal Ay. The voltage of the signal As is a voltage obtained by subtracting the voltage of the input signal Aa from the attenuation voltage of the signal supplied to the terminal Tn1 and adding the attenuation voltage of the signal supplied to the terminal Tn2. Therefore, the voltage of the signal As can be said to be a signal obtained by correcting the deviation obtained by subtracting the voltage of the input signal Aa from the attenuation voltage of the drive signal Com-P output from an output terminal Tn-out with the high-frequency component of the drive signal Com-P.

The comparator 820 outputs a modulated signal Ms, which is a pulse-modulated signal of the signal As. Specifically, the comparator 820 outputs the modulated signal Ms of which the level shifts to an H level when the voltage is equal to or greater than a threshold voltage Vth1 while the voltage of the signal As rises, and shifts to an L level when the voltage falls below a threshold voltage Vth2 while the voltage of the signal As falls. Here, the threshold voltage is set in the relationship of "Vth1>Vth2".

The subtractor 804, the adder 806, and the comparator 820 described above are examples of a modulation circuit 801 that pulse-modulates the input signal Aa to generate the modulated signal Ms.

The gate driver 830 supplies a first gate signal obtained by converting the modulated signal Ms into a high logic amplitude to a gate electrode of the transistor TrH through a terminal TnH and a resistor RH, and supplies a second gate signal obtained by converting the signal in which the logic level of the modulated signal Ms is inverted into a high logic amplitude to a gate electrode of the transistor TrL through a terminal TnL and a resistor RL. Therefore, the logic levels of the gate signals supplied to the gate electrodes of the transistors TrH and TrL have an exclusive relationship with each other. The timing may be controlled so that the logic levels of the two gate signals output by the gate driver 830 are not the H level at the same time. That is, exclusive here means that the logic levels of the gate signals supplied to the gate electrodes of the transistors TrH and TrL are not the H level at the same time, in other words, the transistors TrH and TrL cannot be turned on at the same time.

The modulated signal Ms in the present embodiment is exemplary, and the modulated signal may be a signal that drives the transistors TrH and TrL according to the waveform specifying signal dCom. That is, the modulated signal is not limited to the modulated signal Ms, and includes a signal in which the logic level of the modulated signal Ms is inverted and a signal of which timing is controlled so that the transistors TrH and TrL are not turned on at the same time.

As illustrated in FIG. 6, a voltage Vh is applied to a drain electrode of the transistor TrH on the higher side of the transistors TrH and TrL. Here, the voltage Vh is, for example, 42 volts. Further, a source electrode of the transistor TrL on the lower side is grounded. Each of the transistors TrH and TrL is turned on when the gate signal is at the H level. Therefore, the amplified signal Az obtained by amplifying the modulated signal Ms appears at a node Nd that couples the source electrode of the transistor TrH and the drain electrode of the transistor TrL. In other words, the transistors TrH and TrL output the amplified signal Az obtained by amplifying the modulated signal Ms.

In the following, a circuit that amplifies the modulated signal Ms to generate the amplified signal Az may be referred to as an amplifier circuit 800. In the present embodiment, the amplifier circuit 800 includes a gate driver 830 and the transistor pair 81 including transistors TrH and TrL.

As illustrated in FIG. 6, the drive signal generation circuit GR-P includes an LPF 82 that smooths the amplified signal Az to generate the drive signal Com-P. Here, LPF is an abbreviation for low pass filter. Further, in the present embodiment, the LPF 82 is an example of a "smoothing circuit".

The LPF 82 includes an inductor L0 and a capacitor C0. One end of the inductor L0 is electrically coupled to the node Nd, and the other end is electrically coupled to the output terminal Tn-out. One end of the capacitor C0 is electrically coupled to the output terminal Tn-out, and the other end is grounded.

As illustrated in FIG. 6, the drive signal generation circuit GR-P includes a pull-up circuit 83 that pulls up the drive signal Com-P output to the output terminal Tn-out and feeds back the signal to the terminal Tn1. The pull-up circuit 83 has a resistor R1 having one end electrically coupled to the output terminal Tn-out and the other end electrically coupled to the terminal Tn1, and a resistor R2 having one end electrically coupled to the terminal Tn1 and the other end to which a voltage Vh is applied.

As illustrated in FIG. 6, the drive signal generation circuit GR-P includes a BPF 84 that feeds back a high-frequency component of the drive signal Com-P to the terminal Tn2 by cutting a DC component. Here, BPF is an abbreviation for band pass filter. The BPF 84 includes a resistor R3, a capacitor C1 of which one end is electrically coupled to the output terminal Tn-out and the other end is electrically coupled to one end of the resistor R3, a resistor R4 of which one end is electrically coupled to one end of the resistor R3 and the other end is grounded, a capacitor C2 of which one end is electrically coupled to the other end of the resistor R3 and the other end is grounded, and a capacitor C3 of which one end is electrically coupled to the other end of the resistor R3 and the other end is electrically coupled to the terminal Tn2.

Among them, the capacitor C1 and the resistor R4 function as an HPF that passes high-frequency components above the cutoff frequency of the drive signal Com-P. Here, HPF is an abbreviation for high pass filter. The cutoff frequency of the HPF is set to, for example, approximately 9 MHz.

Further, the resistor R3 and the capacitor C2 function as an LPF that passes a low frequency component below the cutoff frequency of the drive signal Com-P. The cutoff frequency of the LPF is set to, for example, approximately 160 MHz. In the present embodiment, in the BPF 84, the cutoff frequency of the HPF is set to be lower than the cutoff frequency of the LPF. Therefore, the BPF 84 passes the frequency component of the predetermined band in the drive signal Com-P, which is equal to or higher than the cutoff frequency of the HPF and lower than the cutoff frequency of the LPF.

Since the BPF 84 includes the capacitor C3, the signal in which the DC component is cut from the signal in the predetermined band that has passed through the HPF and the LPF in the drive signal Com-P is fed back to the terminal Tn2.

As illustrated in FIG. 6, the drive signal generation circuit GR-P generates the drive signal Com-P by smoothing the amplified signal Az at the node Nd with the LPF82. The drive signal Com-P is integrated and subtracted by the integral attenuator 812, and then fed back to the subtractor 804. Therefore, a self-excited oscillation is performed at the frequency determined by the feedback delay, that is, the sum of the delay in the LPF 82 and the delay in the integral attenuator 812, and a feedback transfer function.

However, since the delay amount of the feedback path through the terminal Tn1 is large, the frequency of self-excited oscillation cannot be increased to such an extent that the accuracy of the waveform of the drive signal Com-P can be sufficiently ensured only by the feedback through the terminal Tn1.

On the other hand, in the present embodiment, in order to provide a path for feeding back the high-frequency component of the drive signal Com-P through the terminal Tn2, separately from the path through the terminal Tn1, the delay of the drive signal generation circuit GR-P as a whole can be reduced. That is, in the present embodiment, the frequency of the signal As, which is the sum of the signal Ab and the signal Ay that is a high-frequency component of the drive signal Com-P, can be increased as compared with a case in which the path through the terminal Tn2 is not present, it is possible to sufficiently ensure the accuracy of the drive signal Com-P.

In the present embodiment, the frequency of self-excited oscillation, that is, the frequency of the modulated signal Ms is set to 1 MHz or more and 8 MHz or less. By setting the modulated signal Ms to the above-mentioned frequency, it is possible to achieve both sufficient accuracy of the waveform of the drive signal Com-P and suppression of switching loss in the transistors TrH and TrL.

Figure 7:
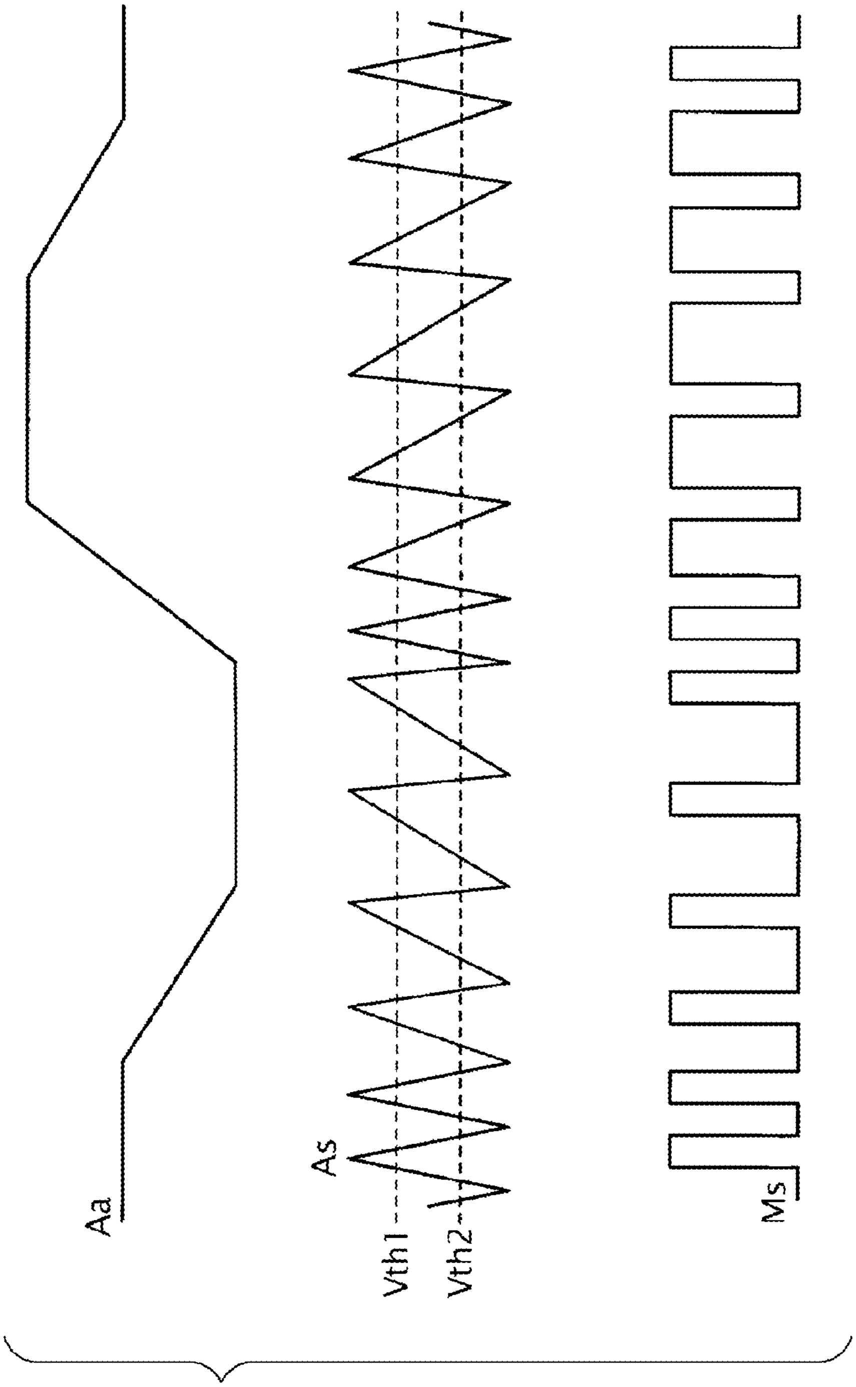
FIG. 7 is an explanatory diagram for describing an example of an input signal and a modulated signal.

FIG. 7 is a diagram showing a relationship among the input signal Aa, the signal As, and the modulated signal Ms.

As illustrated in FIG. 7, the signal As is a triangular wave, and its oscillation frequency fluctuates depending on the voltage of the input signal Aa. Specifically, the oscillation frequency of the signal As is highest when the voltage of the input signal Aa is an intermediate value, decreases as the voltage of the input signal Aa increases from the intermediate value, and decreases as the voltage of the input signal Aa decreases from the intermediate value.

Further, the slope of the triangular wave indicated by the signal As is substantially the same as the "up", where the voltage increased, and the "down", where the voltage decreases, when the voltage of the input signal Aa is near the intermediate value. Therefore, the duty ratio of the modulated signal Ms, which is the result of comparing the signal As with the threshold voltages Vth1 and Vth2 by the comparator 820, is approximately 50%. When the voltage of the input signal Aa increases from the intermediate value, the downward slope of the signal As gets gentler. Therefore, the period during which the modulated signal Ms is at the H level is relatively long, and the duty ratio gets larger. On the other hand, as the voltage of the input signal Aa decreases from the intermediate value, the upward slope of the signal As gets gentler. Therefore, the period during which the modulated signal Ms is at the H level is relatively short, and the duty ratio gets smaller.

Therefore, in the modulated signal Ms, the duty ratio of the modulated signal Ms is approximately 50% at the intermediate value of the voltage of the input signal Aa, increases as the voltage of the input signal Aa increases from the intermediate value, and decreases as the voltage of the input signal Aa decreases from the intermediate value.

The gate driver 830 turns on the transistor TrH when the modulated signal Ms is at the H level, and turns it off when the modulated signal Ms is at the L level. Further, the gate driver 830 turns off the transistor TrL when the modulated signal Ms is at the H level, and turns it on when the modulated signal Ms is at the L level.

Therefore, the voltage of the drive signal Com-P, which is obtained by smoothing the amplified signal Az with the LPF 82 at the node Nd at which the transistors TrH and TrL are electrically coupled, increases as the duty ratio of the modulated signal Ms increases, and decreases as the duty ratio thereof decreases.

Therefore, the drive signal Com-P has a waveform that is an enlargement of the waveform of the analog input signal Aa.

1.4. Configuration of Printing Section

Hereinafter, an example of a configuration of the printing section 30 will be described with reference to FIG. 8.

Figure 8:
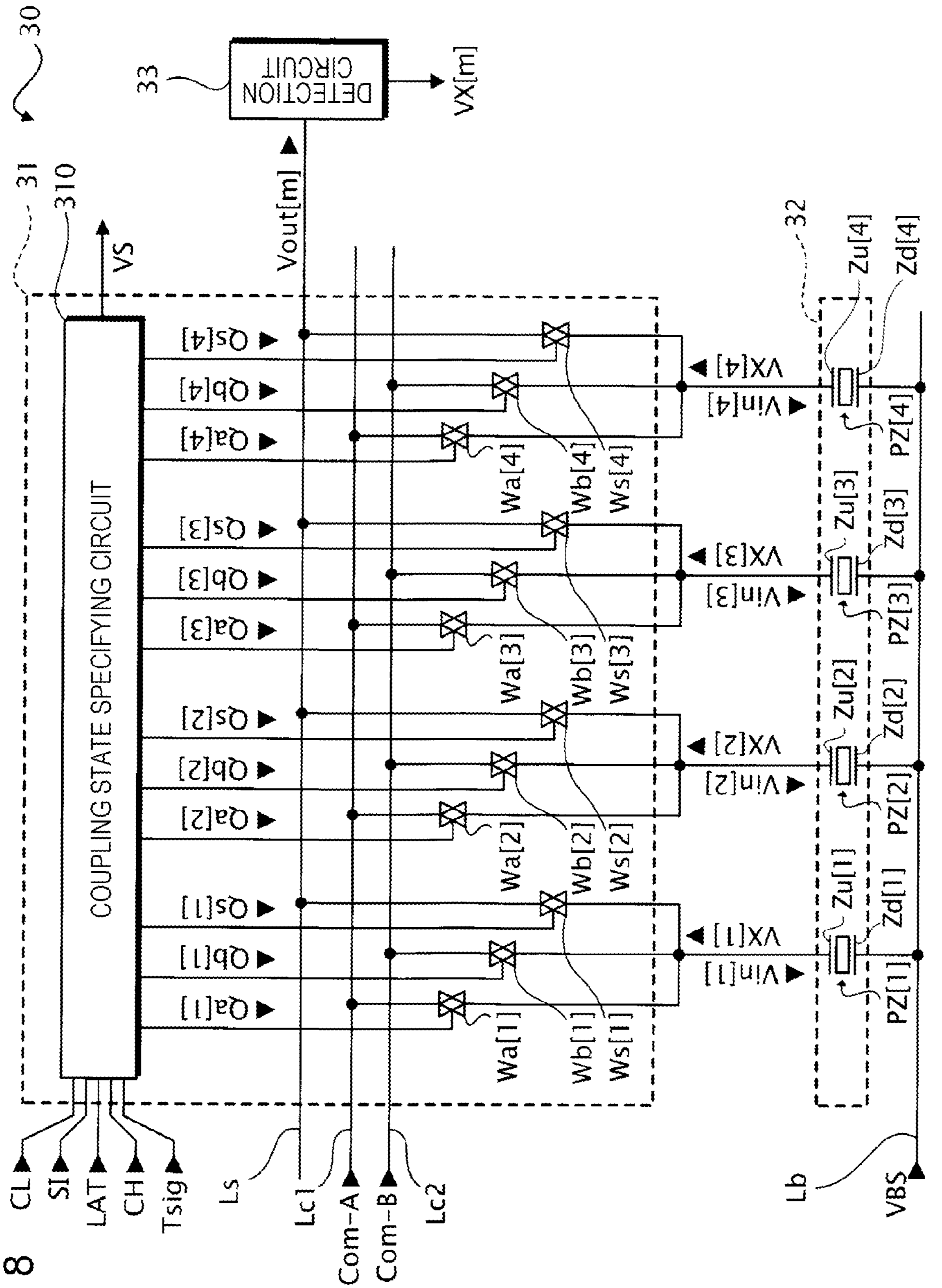
FIG. 8 is a block diagram showing an example of a configuration of a printing section.

FIG. 8 is a block diagram showing an example of the configuration of the printing section 30.

As described above, the printing section 30 includes the supply circuit 31, the ejection head 32, and the detection circuit 33. FIG. 8 illustrates, as an example, a case where the ejection head 32 is provided with four ejection portions D, that is, a case where "M=4".

Further, as illustrated in FIG. 8, the printing section 30 includes a wire Lc1 to which the drive signal Com-A is supplied from the drive signal generation unit 8, a wire Lc2 to which the drive signal Com-B is supplied from the drive signal generation unit 8, a wire Ls for supplying the detection potential signal Vout[m] to the detection circuit 33, and a feeder line Lb set to potential VBS.

As illustrated in FIG. 8, the supply circuit 31 includes M switches Wa[1] to Wa[M] corresponding to the M ejection portions D[1] to D[M] in a one-to-one relationship, M switches Wb[1] to Wb[M] corresponding to the M ejection portions D[1] to D[M] in a one-to-one relationship, M switches Ws[1] to Ws[M] corresponding to the M ejection portions D[1] to D[M] in a one-to-one relationship, and a coupling state specifying circuit 310 that specifies the coupling state of each switch. The coupling state specifying circuit 310 generates a coupling state specifying signal Qa[m] that specifies on/off of the switch Wa[m], a coupling state specifying signal Qb[m] that specifies on/off of the switch Wb[m], and a coupling state specifying signal Qs[m] that specifies on/off of the switch Ws[m], based on at least some of the print signal SI, the latch signal LAT, the period specifying signal Tsig, and the change signal CH supplied from the control unit 2.

Here, the switch Wa[m] switches between conduction and non-conduction between the wire Lc1 and the upper electrode Zu[m] of the piezoelectric element PZ[m] provided on the ejection portion D[m], based on the coupling state specifying signal Qa[m]. In the present embodiment, the switch Wa[m] is turned on when the coupling state specifying signal Qa[m] is at a high level and turned off when the coupling state specifying signal Qa[m] is at a low level. When the switch Wa[m] is turned on, the drive signal Com-A supplied to the wire Lc1 is supplied to the upper electrode Zu[m] of the ejection portion D[m] as the supply drive signal Vin[m].

Further, the switch Wb[m] switches between conduction and non-conduction between the wire Lc2 and the upper electrode Zu[m] of the piezoelectric element PZ[m] provided on the ejection portion D[m], based on the coupling state specifying signal Qb[m]. In the present embodiment, the switch Wb[m] is turned on when the coupling state specifying signal Qb[m] is at a high level and turned off when the coupling state specifying signal Qb[m] is at a low level. When the switch Wb[m] is turned on, the drive signal Com-B supplied to the wire Lc2 is supplied to the upper electrode Zu[m] of the ejection portion D[m] as the supply drive signal Vin[m].

Further, the switch Ws[m] switches between conduction and non-conduction between the wire Ls and the upper electrode Zu[m] of the piezoelectric element PZ[m] provided on the ejection portion D[m], based on the coupling state specifying signal Qs[m]. In the present embodiment, the switch Ws[m] is turned on when the coupling state specifying signal Qs[m] is at a high level and turned off when the coupling state specifying signal Qs[m] is at a low level. When the switch Ws[m] is turned on, the potential of the upper electrode Zu[m] of the ejection portion D[m] is supplied to the detection circuit 33 as the detection potential signal Vout[m] through the wire Ls.

The detection circuit 33 generates the detection signal VX[m] having a waveform corresponding to the waveform of the detection potential signal Vout[m] based on the detection potential signal Vout[m] supplied from the wire Ls.

1.5. Operation of Printing Section

Hereinafter, an example of an operation of the printing section 30 will be described with reference to FIGS. 9 and 10.

In the present embodiment, when the ink jet printer 1 executes the printing process, one or a plurality of unit periods TP are set as an operating period of the ink jet printer 1. The ink jet printer 1 according to the present embodiment can drive each ejection portion D[m] for the printing process in each unit period TP.

Figure 9:
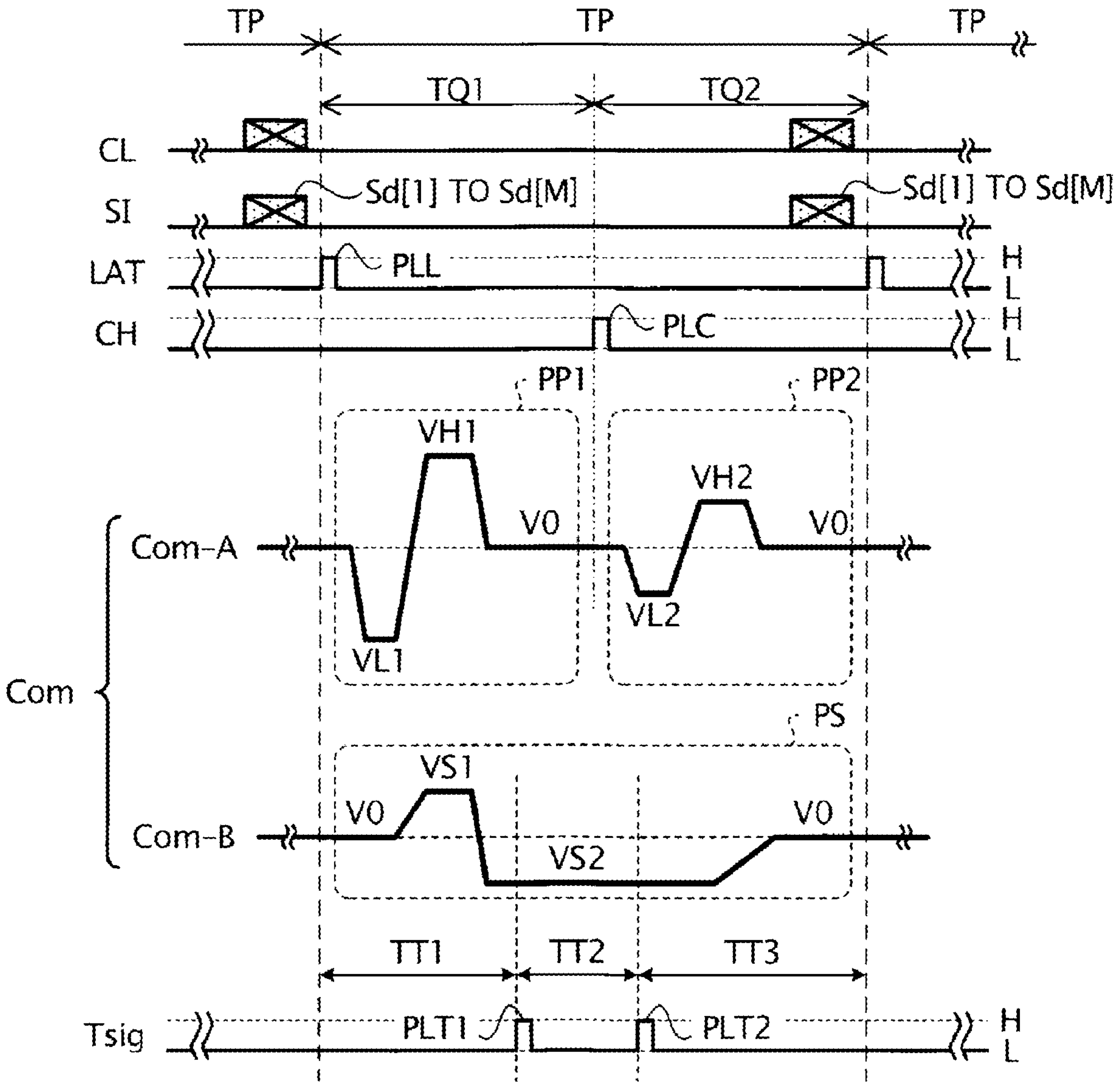
FIG. 9 is a timing chart showing an example of a signal supplied to the printing section.

FIG. 9 is a timing chart for describing an example of various signals supplied to the printing section 30 in the unit period TP.

As illustrated in FIG. 9, the control unit 2 outputs the latch signal LAT having a pulse PLL. Then, the control unit 2 defines the unit period TP as the period from the rise of the pulse PLL to the rise of the next pulse PLL.

Further, the control unit 2 outputs the change signal CH having a pulse PLC in the unit period TP. Then, the control unit 2 divides the unit period TP into a control period TQ1 from the rise of the pulse PLL to the rise of the pulse PLC and a control period TQ2 from the rise of the pulse PLC to the rise of the pulse PLL.

Further, the control unit 2 outputs the period specifying signal Tsig having a pulse PLT1 and a pulse PLT2 in the unit period TP. Then, the control unit 2 divides the unit period TP into a control period TT1 from the rise of the pulse PLL to the rise of the pulse PLT1, a control period TT2 from the rise of the pulse PLT1 to the rise of the pulse PLT2, and a control period TT3 from the rise of pulse PLT2 to the rise of the pulse PLL.

The print signal SI according to the present embodiment includes M individual specifying signals Sd[1] to Sd[M] corresponding to the M ejection portions D[1] to D[M] in a one-to-one relationship. The individual specifying signal Sd[m] specifies the mode of driving the ejection portion D[m] in each unit period TP when the ink jet printer 1 executes the printing process.

As illustrated in FIG. 9, prior to each unit period TP, the control unit 2 supplies the print signal SI including the individual specifying signals Sd[1] to Sd[M] to the coupling state specifying circuit 310 in synchronization with the clock signal CL. Then, the coupling state specifying circuit 310 generates the coupling state specifying signal Qa[m], the coupling state specifying signal Qb[m], and the coupling state specifying signal Qs[m] based on the individual specifying signal Sd[m], in the unit period TP.

In the present embodiment, it is assumed that the ejection portion D[m] can form any of a large dot, a medium dot smaller than the large dot, and a small dot smaller than the medium dot in the unit period TP.

Then, in the present embodiment, it is assumed that the individual specifying signal Sd[m] can take any one of five values, a value "1" that specifies the ejection portion D[m] as a large dot forming ejection portion DP-1 that is a non-inspection target ejection portion DP ejecting an amount of ink corresponding to the large dot, a value "2" that specifies the ejection portion D[m] as a medium dot forming ejection portion DP-2 that is a non-inspection target ejection portion DP ejecting an amount of ink corresponding to the medium dot, a value "3" that specifies the ejection portion D[m] as a small dot forming ejection portion DP-3 that is a non-inspection target ejection portion DP ejecting an amount of ink corresponding to the small dot, a value "4" that specifies the ejection portion D[m] as a non-dot-forming ejection portion DP-B that is a non-inspection target ejection portion DP that does not eject ink, and a value "5" that specifies the ejection portion D[m] as an inspection target ejection portion DS, in the unit period TP.

As illustrated in FIG. 9, in the present embodiment, the drive signal Com-A has a waveform PP1 provided in the control period TQ1 and a waveform PP2 provided in the control period TQ2. Among them, the waveform PP1 is a waveform starting at a reference potential V0 and returning back to the reference potential V0 through the potential VL1 having a potential lower than the reference potential V0 and the potential VH1 having a potential higher than the reference potential V0. When the supply drive signal Vin[m] having the waveform PP1 is supplied to the ejection portion D[m], the waveform PP1 is defined such that the ink corresponding to the ink amount 41 is ejected from the ejection portion D[m]. Further, the waveform PP2 is a waveform starting at a reference potential V0 and returning back to the reference potential V0 through the potential VL2 having a potential lower than the reference potential V0 and the potential VH2 having a potential higher than the reference potential V0. When the supply drive signal Vin[m] having the waveform PP2 is supplied to the ejection portion D[m], the waveform PP2 is defined such that the ink corresponding to the ink amount ξ2 is ejected from the ejection portion D[m].

In the present embodiment, the ink amount ξ1 is an ink amount corresponding to the medium dot. Further, the ink amount ξ2 is an ink amount smaller than the ink amount ξ1 and corresponds to the small dot. The sum of the ink amount ξ1 and the ink amount ξ2 is the amount of ink corresponding to the large dot.

In the present embodiment, as an example, it is assumed that, when the potential of the supply drive signal Vin[m] supplied to the ejection portion D[m] is high, the volume of the cavity 322 provided in the ejection portion D[m] is small as compared with a case of low potential. Therefore, when the ejection portion DM is driven by the supply drive signal Vin[m] having the waveform PP1 or the waveform PP2, the potential of the supply drive signal Vin[m] changes from a low potential to a high potential, thereby the ink in the ejection portion D[m] being ejected from the nozzle N.

As illustrated in FIG. 9, in the present embodiment, the drive signal Com-B has a waveform PS provided in the unit period TP. Here, the waveform PS is a waveform that changes from the reference potential V0 to a potential VS2 having a potential lower than the reference potential V0 through a potential VS1 having a potential higher than the reference potential V0 in the control period TT1, maintains the potential VS2 in the control period TT2, and changes from the potential VS2 to the reference potential V0 in the control period TT3.

In the present embodiment, as an example, it is assumed that when the supply drive signal Vin[m] having the waveform PS is supplied to the ejection portion D[m], the waveform is defined such that the ink is not ejected from the ejection portion D[m]. For example, in the present embodiment, as an example, it is assumed that when the ejection portion D[m] is driven by the supply drive signal Vin[m] having the waveform PS, the waveform PS is defined such that the volume of the cavity 322 of the ejection portion D[m] when the potential of the supply drive signal Vin[m] is the potential VS1 is smaller than the volume of the cavity 322 of the ejection portion D[m] when the potential of the supply drive signal Vin[m] is the potential VS2.

FIG. 10 is an explanatory diagram for describing a relationship among the individual specifying signal Sd[m], the coupling state specifying signal Qa[m], the coupling state specifying signal Qb[m], and the coupling state specifying signal Qs[m] in the unit period TP.

As illustrated in FIG. 10, when the individual specifying signal Sd[m] indicates the value "1" that specifies the ejection portion D[m] as the large dot forming ejection portion DP-1 in the unit period TP, the coupling state specifying circuit 310 sets the coupling state specifying signal Qa[m] to a high level over the control period TQ1 and the control period TQ2. In this case, the switch Wa[m] is turned on over the unit period TP. Therefore, the ejection portion D[m] is driven by the supply drive signal Vin[m] having the waveform PP1 and the waveform PP2 in the unit period TP, and ejects an amount of ink corresponding to the large dot.

Further, when the individual specifying signal Sd[m] indicates the value "2" that specifies the ejection portion D[m] as the medium dot forming ejection portion DP-2 in the unit period TP, the coupling state specifying circuit 310 sets the coupling state specifying signal Qa[m] to the high level in the control period TQ1. In this case, the switch Wa[m] is turned on in the control period TQ1. Therefore, the ejection portion D[m] is driven by the supply drive signal Vin[m] having the waveform PP1 in the unit period TP, and ejects an amount of ink corresponding to the medium dot.

Further, when the individual specifying signal Sd[m] indicates the value "3" that specifies the ejection portion D[m] as the small dot forming ejection portion DP-3 in the unit period TP, the coupling state specifying circuit 310 sets the coupling state specifying signal Qa[m] to the high level in the control period TQ2. In this case, the switch Wa[m] is turned on in the control period TQ2. Therefore, the ejection portion D[m] is driven by the supply drive signal Vin[m] having the waveform PP2 in the unit period TP, and ejects an amount of ink corresponding to the small dot.

Further, when the individual specifying signal Sd[m] indicates the value "4" that specifies the ejection portion D[m] as the non-dot-forming ejection portion DP-B in the unit period TP, the coupling state specifying circuit 310 sets the coupling state specifying signal Qa[m], the coupling state specifying signal Qb[m], and the coupling state specifying signal Qs[m] to the low level over the unit period TP. In this case, the switch Wa[m], the switch Wb[m], and the switch Ws[m] are turned off over the unit period TP. Therefore, the supply drive signal Vin[m] is not supplied to the ejection portion D[m] in the unit period TP, and the ink is not ejected from the ejection portion D[m].

Further, when the individual specifying signal Sd[m] indicates the value "5" that specifies the ejection portion D[m] as the inspection target ejection portion DS in the unit period TP, the coupling state specifying circuit 310 sets the coupling state specifying signal Qb[m] to the high level in the control period TT1 and the control period TT3, and sets the coupling state specifying signal Qs[m] to the high level in the control period TT2. In this case, the switch Wb[m] is turned on in the control period TT1 and the control period TT3, and the switch Ws[m] is turned on in the control period TT2. Therefore, as a result of the ejection portion D[m] specified as the inspection target ejection portion DS being driven by the supply drive signal Vin[m] having the waveform PS in the control period TT1, vibration occurs in the ejection portion D[m], and the vibration remains even in the control period TT2. Then, in the control period TT2, the potential of the upper electrode Zu[m] provided in the ejection portion D[m] changes due to the vibration remaining in the ejection portion D[m]. Then, in the control period TT2, the potential of the upper electrode Zu[m] is supplied to the detection circuit 33 as the detection potential signal Vout[m] through the switch Ws[m].

That is, the waveform of the detection potential signal Vout[m] detected from the ejection portion D[m] in the control period TT2 shows the waveform of the vibration remaining in the ejection portion D[m] in the control period TT2. Then, the waveform of the detection signal VX[m], which is generated based on the detection potential signal Vout[m] detected from the ejection portion D[m] in the control period TT2, shows the waveform of the vibration remaining in the ejection portion D[m] in the control period TT2.

1.6. Operation of Determination Portion

Hereinafter, an example of an operation of the determination portion 40 will be described with reference to FIG. 11.

FIG. 11 is an explanatory diagram for describing an example of an operation of the ejection determination circuit 42.

The ejection determination circuit 42 determines the ink ejection state in the ejection portion D[m] driven as the inspection target ejection portion DS based on the waveform period NTC[m] and amplitude VM[m] indicated by the detection signal VX[m].

As described above, the waveform of the detection signal VX[m] shows the waveform of the vibration remaining in the ejection portion D[m] driven as the inspection target ejection portion DS.

In general, the vibration remaining in the ejection portion D[m] has a vibration period determined by the shape of the nozzle N of the ejection portion D[m], the weight of the ink filled in the cavity 322 of the ejection portion DM, the viscosity of the ink filled in the cavity 322 of the ejection portion D[m], and the like. Then, in general, when an ejection abnormality occurs due to air bubbles mixed in the cavity 322 of the ejection portion D[m], a period NTC[m] of the vibration remaining in the ejection portion D[m] is short as compared with when the ejection state is normal. Further, in general, when an ejection abnormality occurs due to foreign matter such as paper dust adhering to the vicinity of the nozzle N of the ejection portion D[m], the period NTC[m] of the vibration remaining in the ejection portion D[m] is long as compared with when the ejection state is normal. Further, in general, when an ejection abnormality occurs due to the increased viscosity of the ink in the cavity 322 of the ejection portion D[m], the period NTC[m] of the vibration remaining in the ejection portion D[m] is long as compared with when the ejection state is normal. In this way, the period NTC[m] of the vibration remaining in the ejection portion D[m] varies depending on the ink ejection state in the ejection portion D[m]. Therefore, the ink ejection state in the ejection portion D[m] can be determined based on the period NTC[m] of the vibration remaining in the ejection portion D[m].

Further, in general, when an ejection abnormality occurs due to a failure of the piezoelectric element PZ[m] of the ejection portion D[m], the amplitude of the vibration remaining in the ejection portion D[m] is small as compared with when the ejection state is normal. Therefore, the ink ejection state in the ejection portion D[m] can be determined based on the amplitude VM[m] of the vibration remaining in the ejection portion D[m].

As described above, the waveform of the detection signal VX[m] shows the waveform of the vibration remaining in the ejection portion D[m] driven as the inspection target ejection portion DS. That is, the period NTC[m] of the waveform of the detection signal VX[m] is the period of vibration remaining in the ejection portion D[m] driven as the inspection target ejection portion DS. Therefore, the ink ejection state in the ejection portion D[m] driven as the inspection target ejection portion DS can be determined based on the period NTC[m] of the detection signal VX[m]. Further, the amplitude VM[m] of the waveform of the detection signal VX[m] has a magnitude corresponding to the amplitude of the vibration remaining in the ejection portion D[m] driven as the inspection target ejection portion DS. Therefore, the ink ejection state in the ejection portion D[m] driven as the inspection target ejection portion DS can be determined based on the amplitude VM[m] of the detection signal VX[m].

In the present embodiment, the ejection determination circuit 42 measures the period NTC[m] of the detection signal VX[m] and the amplitude VM[m] of the detection signal VX[m] based on the detection signal VX[m].

Then, as illustrated in FIG. 11, the ejection determination circuit 42 determines the ink ejection state in the ejection portion D[m] driven as the inspection target ejection portion DS by comparing the period NTC[m] with one or both of a threshold value Tth-L and a threshold value Tth-H and comparing the amplitude VM[m] with a threshold value VMth, and generates the ejection determination result information BX indicating the result of determination.

Here, the threshold value Tth-L is an estimated value of the boundary between the period TC[m] of the vibration generated in the ejection portion d[m] when the ejection state of the ejection portion D[m] is normal and the period NTC[m] of the vibration generated in the ejection portion D[m] when air bubbles are mixed in the cavity 322 of the ejection portion D[m]. Further, the threshold value Tth-H is a value larger than the threshold value Tth-L, and an estimated value of the boundary between the period NTC[m] of the vibration generated in the ejection portion D[m] when the ejection state of the ejection portion D[m] is normal and the period NTC[m] of the vibration generated in the ejection portion D[m] when foreign matter adheres to the vicinity of the nozzle N of the ejection portion D[m] or when the viscosity of the ink in the cavity 322 of the ejection portion D[m] is increased. Further, the threshold value VMth is an estimated value of the boundary between the amplitude VM[m] of the vibration generated in the ejection portion D[m] when the ejection state of the ejection portion D[m] is normal and the amplitude VM[m] of the vibration generated in the ejection portion D[m] when the piezoelectric element PZ[m] of the ejection portion D[m] fails.

As illustrated in FIG. 11, the ejection determination circuit 42 determines that the ink ejection state in the ejection portion D[m] is normal when "Vth≤VM[m]" is satisfied in terms of the amplitude VM[m] and "Tth-L NTC[m]≤Tth-H" is satisfied in terms of the period NTC[m]. In this case, the ejection determination circuit 42 sets the ejection determination result information BX to a value "1", which indicates that the ink ejection state in the ejection portion D[m] is normal.

Further, the ejection determination circuit 42 determines that an ejection abnormality occurs since air bubbles are mixed in the cavity 322 of the ejection portion D[m] when "Vth≤VM[m]" is satisfied in terms of the amplitude VM[m] and "NTC[m]<Tth-L" is satisfied in terms of the period NTC[m]. In this case, the ejection determination circuit 42 sets the ejection determination result information BX to a value "2", which indicates that an ejection abnormality occurs due to air bubbles in the ejection portion D[m].

Further, the ejection determination circuit 42 determines that an ejection abnormality occurs since foreign matter such as paper dust adheres to the vicinity of the nozzle N of the ejection portion D[m] or the viscosity of the ink in the cavity 322 of the ejection portion D[m] is increased, when "Vth≤VM[m]" is satisfied in terms of the amplitude VM[m] and "Tth-H<NTC[m]" is satisfied in terms of the period NTC[m]. In this case, the ejection determination circuit 42 sets the ejection determination result information BX to a value "3", which indicates that an ejection abnormality occurs due to foreign matter or viscosity in the ejection portion D[m].

Further, the ejection determination circuit 42 determines that an ejection abnormality occurs since the piezoelectric element PZ[m] of the ejection portion D[m] fails, when "VM[m]<Vth" is satisfied in terms of the amplitude VM[m]. In this case, the ejection determination circuit 42 sets the ejection determination result information BX to a value "4", which indicates that an ejection abnormality occurs due to the failure in the piezoelectric element PZ[m] of the ejection portion D[m].

As described above, the ejection determination circuit 42 generates the ejection determination result information BX based on the period NTC[m] and the amplitude VM[m] indicated by the detection signal VX[m]. In the following, among the ejection abnormalities, the failure of the piezoelectric element PZ[m] in the ejection portion D[m] may be referred to as "ejection portion failure". In the present embodiment, the ejection determination circuit 42 is an example of an "inspection section" that inspects whether or not a failure occurs in the ejection portion D[m].

The signal determination circuit 41 determines the supply state of various signals from the control unit 2 to the head unit 3 based on the supply signal VS.

Specifically, when some or all of the print signal SI[q], the clock signal CL, the latch signal LAT, the change signal CH, and the period specifying signal Tsig are not supplied for a certain period or longer from the control unit 2 to the head unit 3 during the period in which electric power is supplied from the power supply unit 9 to the head unit 3, the signal determination circuit 41 determines that a signal supply abnormality occurs since the wire for electrically coupling the control unit 2 to the head unit 3 is broken. In this case, the signal determination circuit 41 sets the signal determination result information BS to a value "1", which indicates that the signal supply abnormality occurs due to the breaking of the wire for electrically coupling the control unit 2 to the head unit 3.

Further, when the wire for electrically coupling the control unit 2 to the head unit 3 is not broken and when there is an inconsistency in the signal contents of some or all of the print signal SI[q], the clock signal CL, the latch signal LAT, the change signal CH, and the period specifying signal Tsig, the signal determination circuit 41 determines that the signal supply abnormality occurs since the information indicated by the signals supplied from the control unit 2 to the head unit 3 is inaccurate. In this case, the signal determination circuit 41 sets the signal determination result information BS to a value "2", which indicates that the signal supply abnormality occurs since the information indicated by the signals supplied from the control unit 2 to the head unit 3 is inaccurate. When there is an inconsistency in the contents of the signals supplied from the control unit 2 to the head unit 3, may refer to, for example, when the pulse intervals of the clock signal CL, the latch signal LAT, the change signal CH, and the period specifying signal Tsig are different from predetermined intervals. Further, when there is an inconsistency in the contents of the signals supplied from the control unit 2 to the head unit 3, may refer to, for example, when there is an inconsistency between the content indicated by the print signal SI and error detection information such as checksum when the print signal SI contains the error detection information.

Further, the signal determination circuit 41 determines that the information indicated by the signals supplied from the control unit 2 to the head unit 3 is accurate when the wire for electrically coupling the control unit 2 to the head unit 3 is not broken and when the information indicated by the signals supplied from the control unit 2 to the head unit 3 is not inaccurate. In this case, the signal determination circuit 41 sets the signal determination result information BS to a value "3", which indicates that the information indicated by the signals supplied from the control unit 2 to the head unit 3 is accurate.

As described above, the signal determination circuit 41 generates the signal determination result information BS based on the supply signal VS. In the following, among the signal supply abnormalities, the disconnection of the wire for electrically coupling the control unit 2 to the head unit 3 may be referred to as a "wire failure".

The temperature determination circuit 43 determines whether or not the temperature of the head module HM is in the normal range based on the temperature signal VT.

Specifically, the temperature determination circuit 43 determines that a temperature abnormality occurs in which the temperature of the head module HM is not in the normal range, when the temperature indicated by the temperature signal VT is equal to or higher than a reference temperature TTth. In this case, the temperature determination circuit 43 sets the temperature determination result information BT to a value "1", which indicates that a temperature abnormality occurs in the head module HM.

Further, the temperature determination circuit 43 determines that the temperature of the head module HM is in the normal range, when the temperature indicated by the temperature signal VT is less than the reference temperature TTth. In this case, the temperature determination circuit 43 sets the temperature determination result information BT to a value "2", which indicates that no temperature abnormality occurs in the head module HM.

As described above, the temperature determination circuit 43 generates the temperature determination result information BT based on the temperature signal VT.

In the present embodiment, the ejection portion failure is an example of an error in which replacement of the ejection head 32 or the head unit 3 is required, and the wire failure is an example of an error in which replacement of the hardware coupled to the head unit 3 is required. That is, the ejection portion failure and the wire failure are examples of a "first error". In the following, the ejection portion failure and the wire failure may be referred to as a "hardware error". Further, in the following, among various determination processes performed by the determination portion 40, a process of determining whether or not the ejection portion failure occurs and a process of determining whether or not the wire failure occurs may be collectively referred to as a "hardware error determination process". The hardware error determination process is an example of the "first determination process".

Further, in the present embodiment, it is assumed that among the signal supply abnormalities, the signal supply abnormality other than the wire failure can be recovered by temporarily stopping the power supply from the power supply unit 9 to the head unit 3. That is, in the present embodiment, the signal supply abnormality other than the wire failure is an example of a "second error". In the following, a signal supply abnormality other than a wire failure may be referred to as a "temporary error". Further, in the following, among various determination processes performed by the determination portion 40, the process of determining whether or not the temporary error occurs may be collectively referred to as a "temporary error determination process". The temporary error determination process is an example of a "second determination process".

Further, in the present embodiment, the temperature abnormality is an example of a "third error". Further, in the following, among various determination processes performed by the determination portion 40, the process of determining whether or not the temperature abnormality occurs may be collectively referred to as a "temperature abnormality determination process". The temperature abnormality determination process is an example of a "third determination process".

1.7. Operation of Light Emitting Portion

Hereinafter, an example of an operation of the light emitting portion 50 will be described with reference to FIG. 12.

Figure 12:
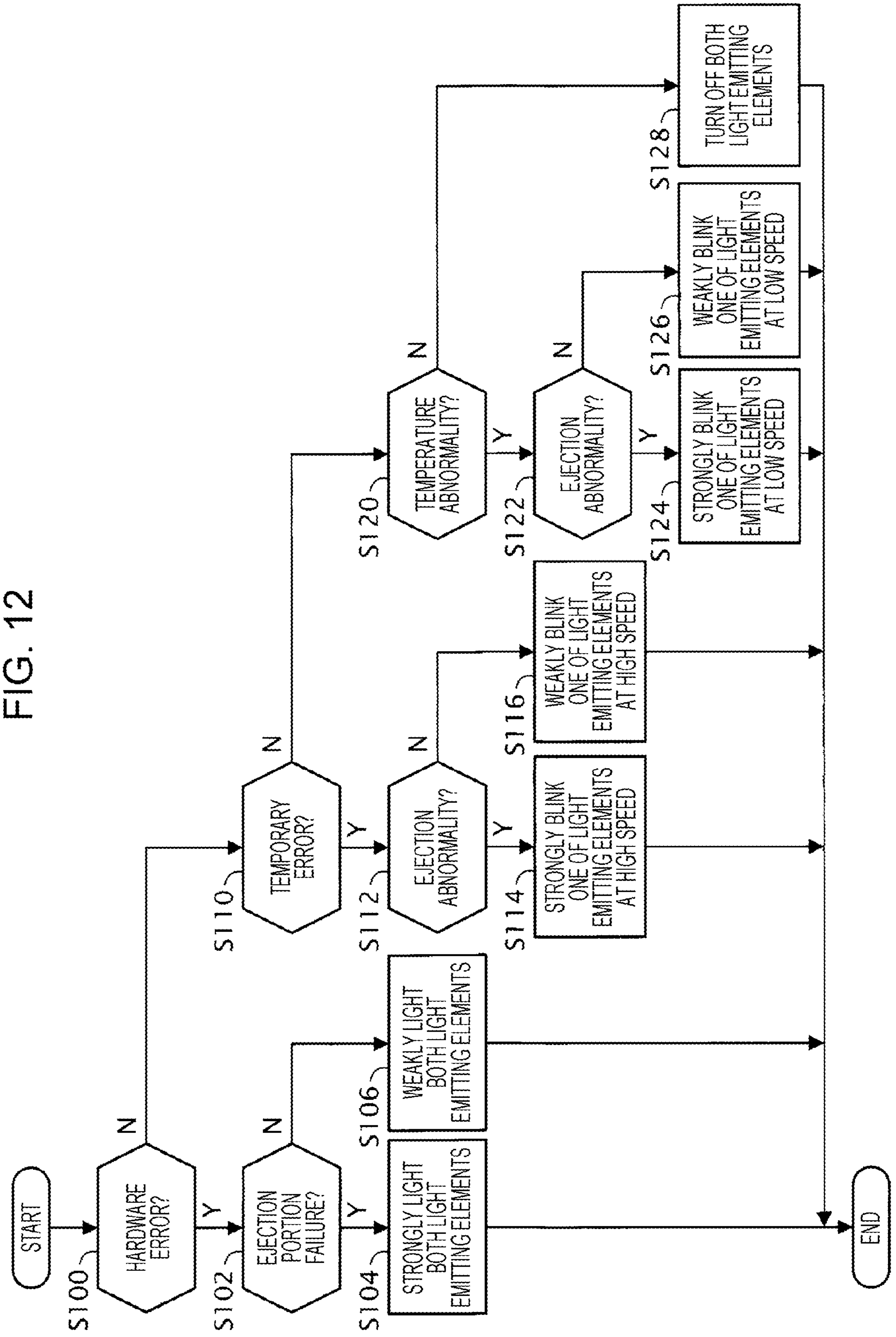
FIG. 12 is a flowchart showing an example of an operation of a light emission control circuit.

FIG. 12 is a flowchart showing an example of an operation of the light emission control circuit 51 in the light emitting portion 50.

As illustrated in FIG. 12, the light emission control circuit 51 determines whether or not the hardware error occurs in the head module HM based on the ejection determination result information BX and the signal determination result information BS of the determination result information BB (S100).

When the result of determination in step S100 is affirmative, the light emission control circuit 51 determines whether or not the ejection portion failure occurs in the head module HM based on the ejection determination result information BX in the determination result information BB (S102).

When the result of determination in step S102 is affirmative, the light emission control circuit 51 lights both the light emitting elements 52, that is, the light emitting element 52-1 and the light emitting element 52-2, with a relatively strong luminous intensity (S104).

When the result of determination in step S102 is negative, the light emission control circuit 51 lights both the light emitting elements 52, that is, the light emitting element 52-1 and the light emitting element 52-2, with a relatively weak luminous intensity (S106).

When the result of determination in step S100 is negative, the light emission control circuit 51 determines whether or not the temporary error occurs in the head module HM based on the signal determination result information BS in the determination result information BB (S110).

When the result of determination in step S110 is affirmative, the light emission control circuit 51 determines whether or not the ejection abnormality occurs in the head module HM based on the ejection determination result information BX in the determination result information BB (S112).

When the result of determination in step S112 is affirmative, the light emission control circuit 51 blinks the light emitting element 52, that is, one of the light emitting element 52-1 and the light emitting element 52-2, with a relatively strong luminous intensity at high speed at short intervals (S114).

When the result of determination in step S112 is negative, the light emission control circuit 51 blinks the light emitting element 52, that is, one of the light emitting element 52-1 and the light emitting element 52-2, with a relatively weak luminous intensity at high speed at short intervals (S116).

When the result of determination in step S110 is negative, the light emission control circuit 51 determines whether or not the temperature abnormality occurs in the head module HM based on the temperature determination result information BT in the determination result information BB (S120).

When the result of determination in step S120 is affirmative, the light emission control circuit 51 determines whether or not the ejection abnormality occurs in the head module HM based on the ejection determination result information BX in the determination result information BB (S122).

When the result of determination in step S122 is affirmative, the light emission control circuit 51 blinks the light emitting element 52, that is, one of the light emitting element 52-1 and the light emitting element 52-2, with a relatively strong luminous intensity at low speed at long intervals (S124).

When the result of determination in step S122 is negative, the light emission control circuit 51 blinks the light emitting element 52, that is, one of the light emitting element 52-1 and the light emitting element 52-2 with a relatively weak luminous intensity at low speed at long intervals (S126).

When the result of determination in step S120 is negative, the light emission control circuit 51 turns off both the light emitting elements 52, that is, the light emitting element 52-1 and the light emitting element 52-2 (S128).

1.8. Summary of First Embodiment

As described above, the head unit 3 according to the present embodiment is the head unit 3 including the ejection portion D for ejecting ink, and the head unit 3 includes the determination portion 40 executes a hardware error determination process of determining whether or not a hardware error occurs in which replacement of the head unit 3 or replacement of the wire coupled to the head unit 3 is required, and a temporary error determination process of determining whether or not a temporary error occurs in which neither replacement of the head unit 3 or replacement of the wire coupled to the head unit 3 is required, and the light emitting portion 50 that emits light according to the result of determination in the determination portion 40.

That is, according to the present embodiment, the determination portion 40 is provided in the head unit 3, and thus the determination portion 40 can accurately acquire the information indicating the state of the head unit 3 as compared with the mode in which the determination portion 40 is provided outside the head unit 3, which makes it possible for a user of the head unit 3 to accurately recognize the defect of the head unit 3.

Further, according to the present embodiment, the light emitting portion 50 is provided in the head unit 3, and thus the light emitting portion 50 can reduce the possibility that noise is superimposed on the determination result information BB output from the determination portion 40 as compared with the mode in which the light emitting portion 50 is provided outside the head unit 3, which makes it possible for the user of the head unit 3 to accurately recognize the defect of the head unit 3.

Further, according to the present embodiment, the determination portion 40 and the light emitting portion 50 are provided in the head unit 3, and thus it is possible for the user of the head unit 3 to accurately recognize the defect of the head unit 3 even if the wire coupled to the head unit 3 from the outside of the head unit 3 are defective and a signal cannot be supplied from the head unit 3 to the outside of the head unit 3.

Further, in the head unit 3 according to the present embodiment, the light emitting portion 50 may light when the result of determination in the hardware error determination process is affirmative, and may blink when the result of determination in the temporary error determination process is affirmative.

Therefore, according to the present embodiment, the user of the head unit 3 can grasp the content of the defect occurring in the head unit 3 by visually observing the head unit 3.

Further, in the head unit 3 according to the present embodiment, the temporary error may be an error that can be recovered by temporarily stopping the supply of power to the head unit 3.

Therefore, according to the present embodiment, the user of the head unit 3 can grasp the method of solving the defect occurring in the head unit 3 by visually observing the head unit 3.

Further, in the head unit 3 according to the present embodiment, the determination portion 40 performs a temperature abnormality determination process of determining whether or not a temperature abnormality occurs in which the temperature in the head unit 3 is equal to or higher than the reference temperature TTth, and the light emitting portion 50 blinks when the result of determination in the temperature abnormality determination process is affirmative at a speed different from when the result of determination in the temporary error determination process is affirmative.

Therefore, according to the present embodiment, the user of the head unit 3 can grasp the method of solving the defect occurring in the head unit 3 by visually observing the head unit 3.

Further, in the head unit 3 according to the present embodiment, when the result of determination in the temporary error determination process is affirmative, the light emitting portion 50 blinks at shorter intervals than when the result of determination in the temperature abnormality determination process is affirmative.

Therefore, according to the present embodiment, the user of the head unit 3 can grasp the method of solving the defect occurring in the head unit 3 by visually observing the head unit 3.

Further, in the head unit 3 according to the present embodiment, the determination portion 40 may include the ejection determination circuit 42 for inspecting the ejection portion D for the occurrence of a failure, the hardware error may include a failure of the ejection portion D, and the light emitting portion 50 may make a lighting intensity when the result of determination in the hardware error determination process is affirmative and the failure occurs in the ejection portion stronger than a lighting intensity when the result of determination in the hardware error determination process is affirmative and the failure does not occur in the ejection portion.

Therefore, according to the present embodiment, the user of the head unit 3 can grasp the content of the defect occurring in the head unit 3 by visually observing the head unit 3.

Further, the head unit 3 according to the present embodiment is the head unit 3 including the ejection portion D for ejecting ink, and the head unit 3 includes the determination portion 40 executes a hardware error determination process of determining whether or not a hardware error occurs in which replacement of the head unit 3 or replacement of the wire coupled to the head unit 3 is required, and a temporary error determination process of determining whether or not a temporary error occurs in which neither replacement of the head unit 3 or replacement of the wire coupled to the head unit 3 is required, and the light emitting portion 50 that causes the number of light emitting elements 52 according to a result of determination in the determination portion 40 to emit light.

Therefore, according to the present embodiment, the user of the head unit 3 can grasp the content of the defect occurring in the head unit 3 by visually observing the head unit 3.

Further, in the head unit 3 according to the present embodiment, the light emitting portion 50 may cause more light emitting elements 52 to emit light when the result of determination in the hardware error determination process is affirmative than when the result of determination in the temporary error determination process is affirmative.

Therefore, according to the present embodiment, the user of the head unit 3 can grasp the content of the defect occurring in the head unit 3 by visually observing the head unit 3.

Further, the head unit 3 according to the present embodiment may include the ejection head 32 having the piezoelectric element PZ driven by the drive signal Com and ejecting ink in response to the drive of the piezoelectric element PZ, the flow path member 63 provided with a liquid flow path for supplying ink to the ejection head 32, the circuit board 60 provided with the supply circuit 31 for supplying the drive signal Com to the piezoelectric element PZ and disposed between the ejection head 32 and the flow path member 63, and the light emitting element 52 disposed between the circuit board 60 and the flow path member 63, and the flow path member 63 may be provided with the light guide tube 53 that guides the light emitted by the light emitting element 52 to the outside of the flow path member 63.

That is, according to the present embodiment, the circuit board 60 is provided between the light emitting element 52 and the ejection head 32, and thus it is possible to reduce the possibility of the ink ejected from the ejection head 32 and the ink stored inside the ejection head 32 being irradiated with the light emitted from the light emitting element 52, as compared with the mode in which the light emitting element 52 is disposed between the circuit board 60 and the ejection head 32. Therefore, according to the present embodiment, it is possible to reduce the influence of the light emitted by the light emitting element 52 on the ink, as compared with the mode in which the light emitting element 52 is provided between the circuit board 60 and the ejection head 32, which makes it possible to reduce the possibility that the ink deteriorates.

Further, in the present embodiment, the flow path member 63 is provided with the light guide tube 53 that guides the light emitted by the light emitting element 52 to the outside of the flow path member 63, and thus it is possible to reduce the possibility of the ink stored inside the flow path member 63 being irradiated with the light emitted by the light emitting element 52, as compared with the mode in which the flow path member 63 is irradiated with the light emitted by the light emitting element 52 since the light guide tube 53 is not provided in the flow path member 63. Therefore, according to the present embodiment, it is possible to reduce the influence of the light emitted by the light emitting element 52 on the ink, as compared with the mode in which the light guide tube 53 is not provided in the flow path member 63, which makes it possible to reduce the possibility that the ink deteriorates.

Further, according to the present embodiment, the light emitting element 52 is provided in the head unit 3, and thus it is possible to use the light emitting element 52 to notify the user of the head unit 3 of a defect in the head unit 3 even if the wire coupled to the head unit 3 from the outside of the head unit 3 is defective and a signal cannot be supplied from the head unit 3 to the outside of the head unit 3.

Further, the head unit 3 according to the present embodiment may include the determination portion 40 that determines whether or not the hardware error related to the head unit 3 or the wire coupled to the head unit 3 occurs, and the light emitting element 52 may emit light according to the result of determination in the determination portion 40.

That is, according to the present embodiment, the determination portion 40 is provided in the head unit 3, and thus the determination portion 40 can accurately acquire the information indicating the state of the head unit 3 as compared with the mode in which the determination portion 40 is provided outside the head unit 3, which makes it possible for a user of the head unit 3 to accurately recognize the defect of the head unit 3.

Further, according to the present embodiment, the light emitting element 52 is provided in the head unit 3, and thus the light emitting element 52 can reduce the possibility that noise is superimposed on the determination result information BB output from the determination portion 40 as compared with the mode in which the light emitting element 52 is provided outside the head unit 3, which makes it possible for the user of the head unit 3 to accurately recognize the defect of the head unit 3.

Further, according to the present embodiment, the determination portion 40 and the light emitting element 52 are provided in the head unit 3, and thus it is possible for the user of the head unit 3 to accurately recognize the defect of the head unit 3 even if the wire coupled to the head unit 3 from the outside of the head unit 3 are defective and a signal cannot be supplied from the head unit 3 to the outside of the head unit 3.

Further, in the head unit 3 according to the present embodiment, the circuit board 60 may be made of a glass epoxy resin.

Further, in the head unit 3 according to the present embodiment, the flow path member 63 may be made of plastic.

Further, in the head unit 3 according to the present embodiment, the flow path member 63 may include a side surface portion, which is a visible portion when the flow path member 63 is viewed in a direction orthogonal to the −Z direction that is an ink ejection direction from the ejection head 32, and the light guide tube 53 may guide the light emitted by the light emitting element 52 from the opening 54 provided in the side surface portion to the outside of the flow path member 63.

That is, in the present embodiment, the light guide tube 53 guides the light emitted by the light emitting element 52 from the opening 54 provided in the side surface portion to the outside of the flow path member 63, and thus it is possible to reduce the possibility of the ink ejected from the ejection head 32 and the ink stored inside the ejection head 32 being irradiated with the light emitted from the light emitting element 52, as compared with the mode in which the light emitted by the light emitting element 52 is guided to the lower surface portion, which is a visible portion when the flow path member 63 is viewed in the direction opposite to the ink ejection direction from the ejection head 32. Therefore, according to the present embodiment, it is possible to reduce the influence of the light emitted by the light emitting element 52 on the ink, as compared with the mode in which the light emitted by the light emitting element 52 is guided to the lower surface portion, which makes it possible to reduce the possibility that the ink deteriorates.

Further, in the head unit 3 according to the present embodiment, the light emitting element 52 may be provided at the end of the circuit board 60.

Therefore, according to the present embodiment, it is possible to reduce the influence of the light emitted by the light emitting element 52 on the ink, as compared with the mode in which the light emitting element 52 is provided at the central portion of the circuit board 60, which makes it possible to reduce the possibility that the ink deteriorates.

Further, in the head unit 3 according to the present embodiment, the light emitting element 52 may be configured to include a light emitting diode.

Further, in the head unit 3 according to the present embodiment, the light emitted by the light emitting element 52 may be visible light having a wavelength of 570 nm or more.

Therefore, according to the present embodiment, when ultraviolet curable ink is employed as the ink ejected from the ejection head 32, it is possible to reduce the influence of the light emitted by the light emitting element 52 on the ink, as compared with the mode in which the light emitted by the light emitting element 52 has a wavelength of less than 570 nm, which makes it possible to reduce the possibility that the ink deteriorates.

Further, in the head unit 3 according to the present embodiment, the ink ejected from the ejection head 32 may cure when the ink is irradiated with an ultraviolet ray.

Further, the head unit 3 according to the present embodiment, the ink ejected from the ejection head 32 may contain a disazo-based color material.

1.9. Modification Example of First Embodiment

The above embodiment can be modified in various ways. Specific modes of modification are illustrated below. Any two or more modes selected from the following examples can be appropriately merged within the extent that they do not contradict each other. In the modification examples illustrated below, elements whose actions and functions are the same as those of the embodiment will be denoted by the same reference numerals referred to in the above description, and detailed description thereof will be omitted as appropriate.

Modification Example 1.1

In the above-described embodiment, the light guide tube 53 guides the light emitted by the light emitting element 52 from the opening 54 provided in the side surface portion of the flow path member 63 to the outside of the flow path member 63, but the present disclosure is not limited to such modes. For example, the light guide tube may be provided such that the light emitted by the light emitting element 52 is guided from an opening provided in an upper portion, which is a portion that can be visually recognized when the flow path member 63 is viewed in the −Z direction, to the outside of the flow path member 63.

Figure 13:
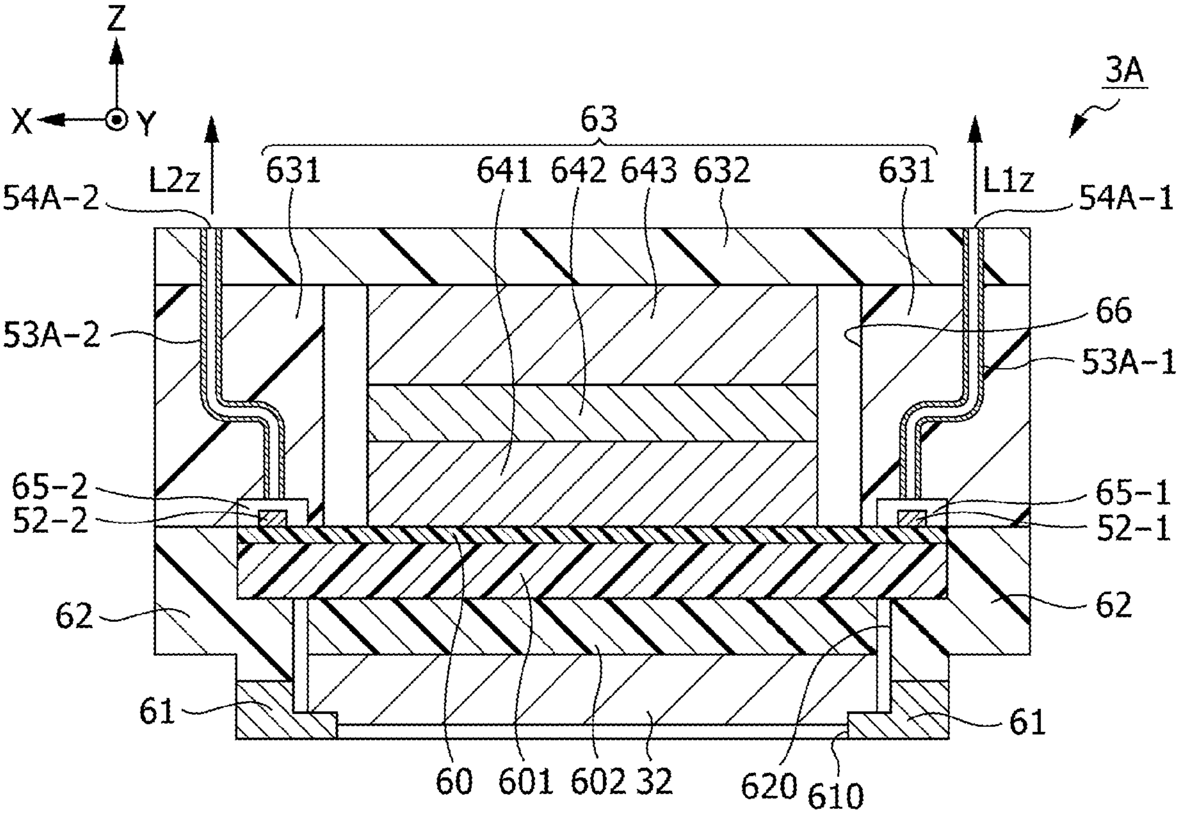
FIG. 13 is a cross-sectional view showing an example of a schematic structure of a head unit according to Modification Example 1.1.

FIG. 13 is an example of a schematic partial cross-sectional view of a head unit 3A obtained by cutting the head unit 3A according to the present modification example in a plane parallel to the XZ plane. The ink jet printer according to the present modification example is different from the ink jet printer 1 according to the first embodiment in that the head unit 3A is provided instead of the head unit 3.

As illustrated in FIG. 13, the head unit 3A is different from the head unit 3 according to the first embodiment in that a light guide tube 53A-1 and a light guide tube 53A-2 are provided instead of the light guide tube 53-1 and the light guide tube 53-2.

Here, the light guide tube 53A-1 is a component that guides the light emitted by the light emitting element 52-1 to the opening 54A-1. For example, the light guide tube 53A-1 may be an optical fiber.

Further, the opening 54A-1 is an element for emitting the light emitted from the light emitting element 52-1 and guided by the light guide tube 53A-1 to the outside of the head unit 3. In the present modification example, the opening 54A-1 is provided in a portion that can be visually recognized when the upper frame portion 632 is viewed in the −Z direction. In this case, the light guide tube 53A-1 may be provided to couple the recess 65-1 to the opening 54A-1 in the outer frame portion 631 and the upper frame portion 632. However, the present modification example is not limited to such a mode. For example, the opening 54A-1 may be provided in a portion that can be visually recognized when the outer frame portion 631 is viewed in the −Z direction. In this case, the light guide tube 53A-1 may be provided to couple the recess 65-1 to the opening 54A-1 in the outer frame portion 631. That is, the opening 54A-1 may be provided in the upper portion that can be visually recognized when the flow path member 63 is viewed in the −Z direction. The opening 54A-1 is provided so that the light emitting element 52-1 is located between the ejection head 32 and the opening 54A-1 in the Z-axis direction.

In the present embodiment, the light emitted from the opening 54A-1 travels in a direction Liz. However, the light emitted from the opening 54A-1 may travel to diffuse around the direction L1*z*. Here, the direction L1*z* is a direction parallel to the +Z direction when viewed in the Y-axis direction. However, the direction L1*z* may be the direction between the +X direction or the −X direction and the +Z direction when viewed in the Y-axis direction.

The light guide tube 53A-2 is a component that guides the light emitted by the light emitting element 52-2 to an opening 54A-2. For example, the light guide tube 53A-2 may be an optical fiber.

Further, the opening 54A-2 is an element for emitting the light emitted from the light emitting element 52-2 and guided by the light guide tube 53A-2 to the outside of the head unit 3. In the present modification example, the opening 54A-2 is provided in a portion that can be visually recognized when the upper frame portion 632 is viewed in the −Z direction. In this case, the light guide tube 53A-2 may be provided to couple the recess 65-2 to the opening 54A-2 in the outer frame portion 631 and the upper frame portion 632. However, the present modification example is not limited to such a mode. For example, the opening 54A-2 may be provided in a portion that can be visually recognized when the outer frame portion 631 is viewed in the −Z direction. In this case, the light guide tube 53A-2 may be provided to couple the recess 65-2 to the opening 54A-2 in the outer frame portion 631. That is, the opening 54A-2 may be provided in the upper portion that can be visually recognized when the flow path member 63 is viewed in the −Z direction. The opening 54A-2 is provided so that the light emitting element 52-1 is located between the ejection head 32 and the opening 54A-2 in the Z-axis direction.

In the present embodiment, the light emitted from the opening 54A-2 travels in a direction L2*z*. However, the light emitted from the opening 54A-2 may travel to diffuse around the direction L2*z*. Here, the direction L2*z* is a direction parallel to the +Z direction when viewed in the Y-axis direction. However, the direction L2*z* may be the direction between the +X direction or the −X direction and the +Z direction when viewed in the Y-axis direction.

Further, in the present embodiment, the opening 54A-1 and the opening 54A-2 are examples of the "upper opening".

As described above, in the head unit 3A according to the present modification example, the flow path member 63 may include an upper portion, which is a visible portion when the flow path member 63 is viewed in the −Z direction that is the ink ejection direction from the ejection head 32, and the light guide tube 53A may guide the light emitted by the light emitting element 52 from the opening 54A provided in the upper portion to the outside of the flow path member 63.

That is, in the present modification example, the light guide tube 53A guides the light emitted by the light emitting element 52 from the opening 54A provided in the upper portion to the outside of the flow path member 63, and thus it is possible to reduce the possibility of the ink ejected from the ejection head 32 and the ink stored inside the ejection head 32 being irradiated with the light emitted from the light emitting element 52, as compared with the mode in which the light emitted by the light emitting element 52 is guided to the lower surface portion. Therefore, according to the present embodiment, it is possible to reduce the influence of the light emitted by the light emitting element 52 on the ink, as compared with the mode in which the light emitted by the light emitting element 52 is guided to the lower surface portion, which makes it possible to reduce the possibility that the ink deteriorates.

Modification Example 1.2

In the above-described embodiment and modification example, the drive signal generation circuit GR is provided outside the head unit 3 or the head unit 3A, but the present disclosure is not limited to the modes. The drive signal generation circuit GR may be provided in the head unit.

Figure 14:
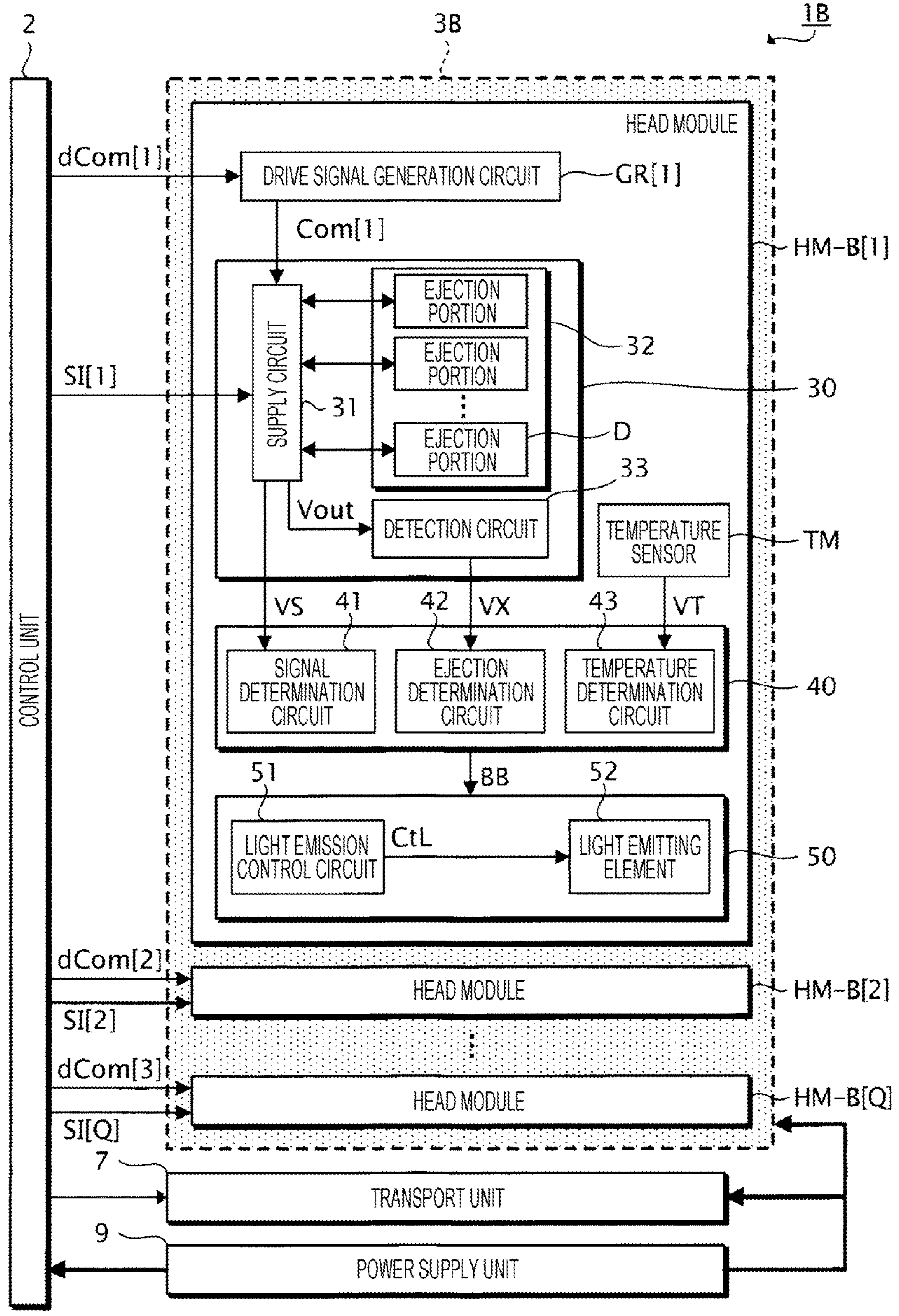
FIG. 14 is a block diagram showing an example of a configuration of an ink jet printer according to Modification Example 1.2.

FIG. 14 is a functional block diagram showing an example of a configuration of an ink jet printer 1B according to the present modification example.

As illustrated in FIG. 14, the ink jet printer 1B according to the present modification example is different from the ink jet printer 1 according to the first embodiment in that a head unit 3B is provided instead of the head unit 3.

Further, the head unit 3B is different from the head unit 3 according to the first embodiment in that a head module HM-B is provided instead of the head module HM.

Further, the head module HM-B is different from the head module HM according to the first embodiment in that the drive signal generation circuit GR is provided.

As described above, according to the present modification example, the drive signal generation circuit GR is mounted on the head unit 3B, and thus it is not necessary to provide the drive signal generation circuit GR in the ink jet printer when the head unit 3B is incorporated into the ink jet printer. That is, according to the present modification example, the drive signal generation circuit GR is mounted on the head unit 3B, and thus the design when the head unit 3B is incorporated into the ink jet printer and the manufacture of the ink jet printer on the premise that the head unit 3B is incorporated are made easy.

2. Second Embodiment

Hereinafter, a second embodiment of the present disclosure will be described. In each embodiment illustrated below, elements whose actions and functions are similar to those of the first embodiment will be denoted by the same reference numerals used in the description of the first embodiment and detailed description thereof will be omitted as appropriate.

2.1. Overview of Ink Jet Printer Functions

Hereinafter, an example of a functional configuration of an ink jet printer 1C according to the second embodiment will be described with reference to FIGS. 15 and 16.

The ink jet printer 1 according to the first embodiment uses light to give a notification on the state of the head unit 3, whereas the ink jet printer 1C according to the second embodiment uses sound to give a notification on the state of the head unit.

Figure 15:
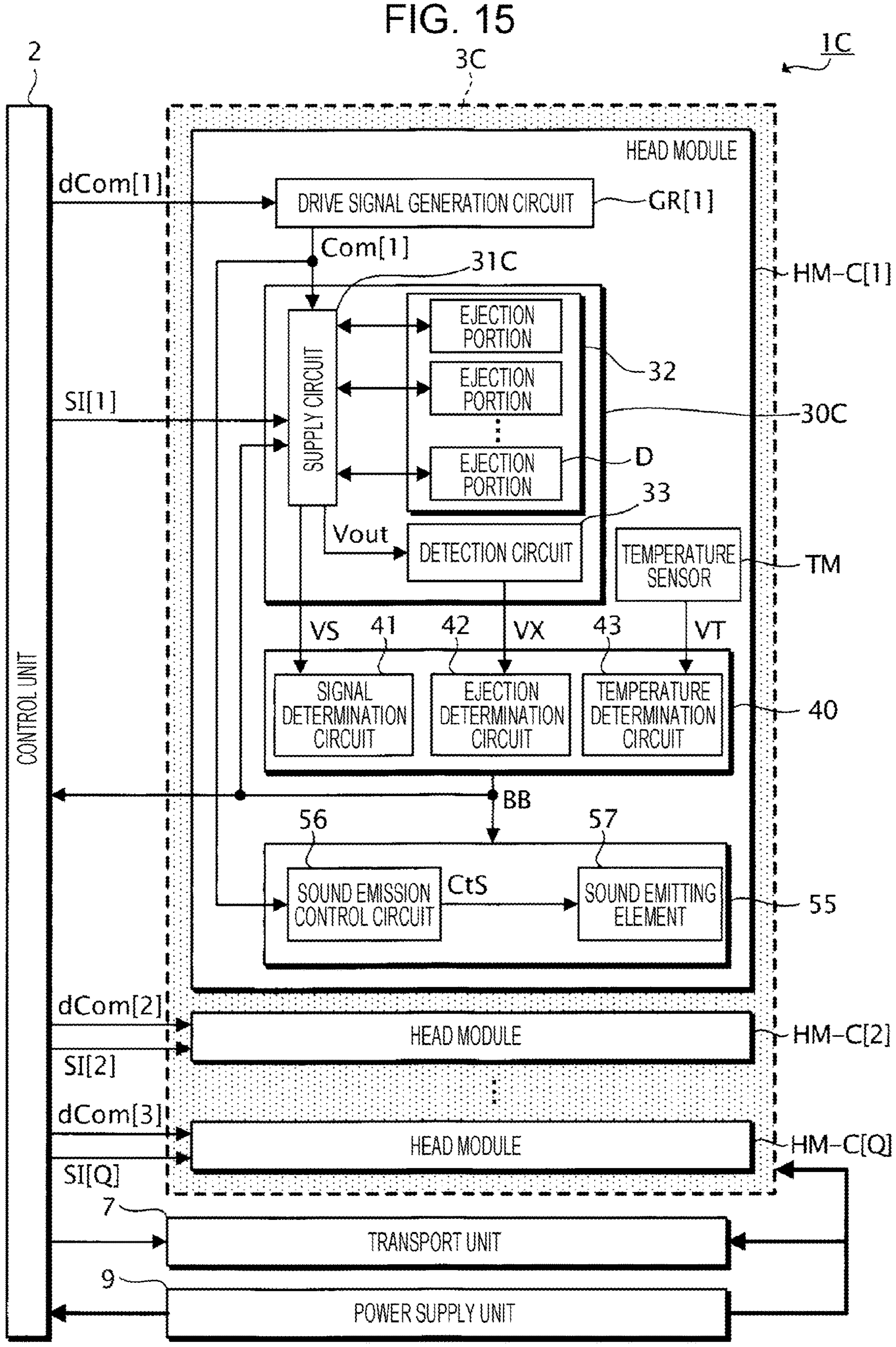
FIG. 15 is a block diagram showing an example of a configuration of an ink jet printer according to a second embodiment.

FIG. 15 is a functional block diagram showing an example of a configuration of the ink jet printer 1C.

As illustrated in FIG. 15, the ink jet printer 1C according to the present modification example is different from the ink jet printer 1 according to the first embodiment in that a head unit 3C is provided, instead of the head unit 3.

Further, the head unit 3C is different from the head unit 3 according to the first embodiment in that a head module HM-C is provided instead of the head module HM.

Further, the head module HM-C is different from the head module HM according to the first embodiment in that the head module includes the drive signal generation circuit GR, a printing section 30C instead of the printing section 30, and a sound emitting portion 55 instead of the light emitting portion 50.

Further, the printing section 30C is different from the printing section 30 according to the first embodiment in that a supply circuit 31C is provided instead of the supply circuit 31.

As illustrated in FIG. 15, the sound emitting portion 55 includes a sound emission control circuit 56 and one or more sound emitting elements 57. In the present embodiment, as an example, it is assumed that the sound emitting portion 55 includes two sound emitting elements 57.

The sound emitting element 57 is, for example, a piezoelectric element. In the present embodiment, in order to distinguish the sound emitting element 57 from the piezoelectric element PZ, the piezoelectric element PZ may be referred to as a "first driving element" and the sound emitting element 57 may be referred to as a "second driving element".

The sound emission control circuit 56 generates a sound emission control signal CtS for causing one or both of the two sound emitting elements 57 to emit sound based on the determination result information BB.

Figure 16:
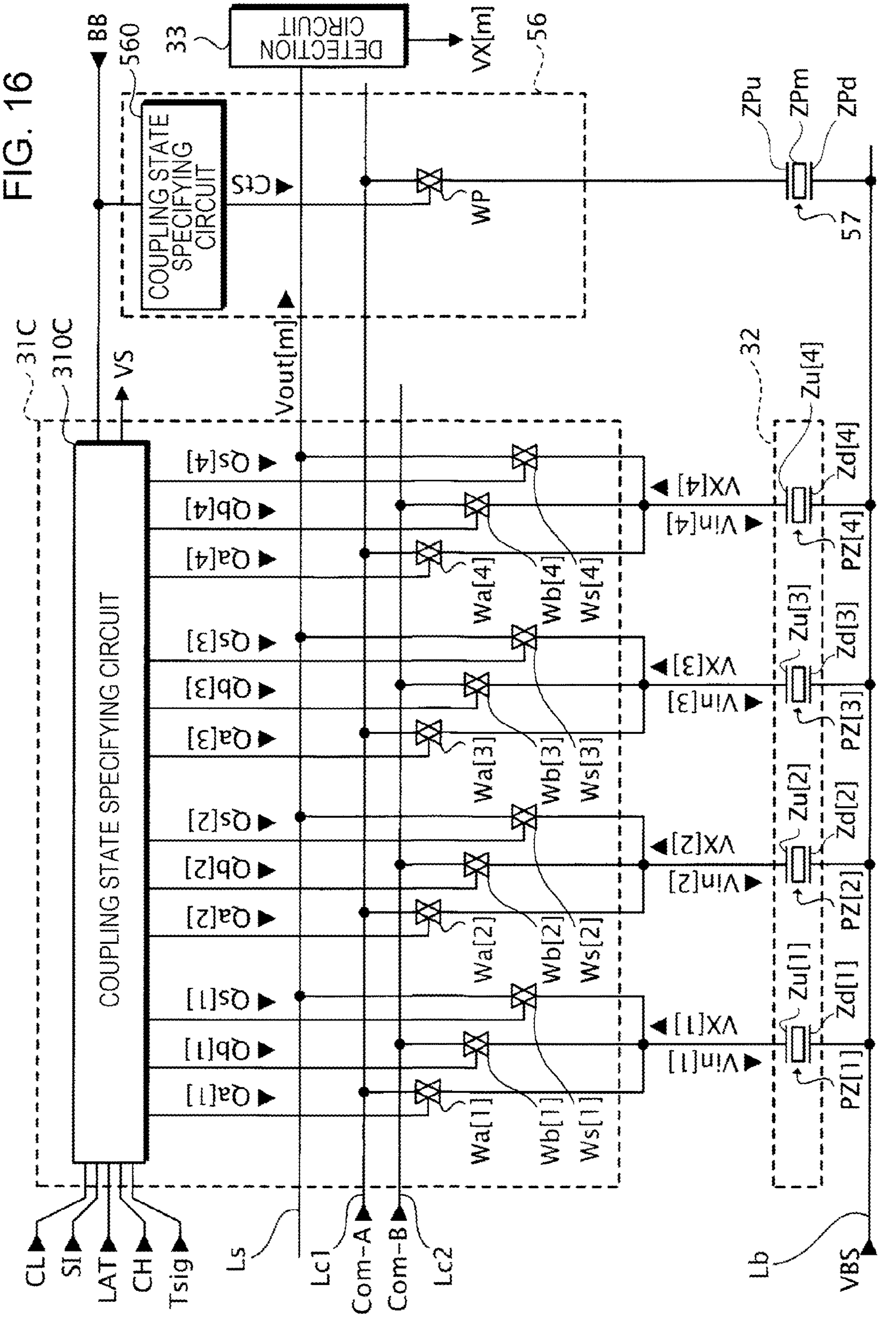
FIG. 16 is a block diagram showing an example of a configuration of a printing section and a sound emitting portion.

FIG. 16 is a block diagram showing an example of the configuration of the supply circuit 31C, the ejection head 32, and the detection circuit 33 included in the printing section 30C, and the sound emission control circuit 56 and, and the sound emitting element 57 included in the sound emitting portion 55.

As illustrated in FIG. 16, the sound emitting element 57 includes an upper electrode ZPu, a lower electrode ZPd, a piezoelectric body ZPm provided between the upper electrode ZPu and the lower electrode ZPd. The lower electrode ZPd is electrically coupled to the feeder line Lb. Further, the drive signal Com is supplied to the upper electrode ZPu based on the control by the sound emission control circuit 56. That is, a voltage is applied between the upper electrode ZPu and the lower electrode ZPd with the supply of the drive signal Com to the upper electrode ZPu. Then, the sound emitting element 57 is displaced depending on the voltage applied between the upper electrode ZPu and the lower electrode ZPd, and as a result of the displacement, the sound emitting element 57 vibrates. Then, the sound emitting element 57 emits sound by being vibrated by the drive signal Com.

Further, the sound emission control circuit 56 includes a switch WP, a coupling state specifying circuit 560 that specifies a coupling state of the switch WP. The coupling state specifying circuit 560 generates a sound emission control signal CtS that specifies on/off of the switch WP based on the determination result information BB. The switch WP switches between conduction and non-conduction between the wire Lc1 and the upper electrode ZPu provided on the sound emitting element 57, based on the sound emission control signal CtS. In the present embodiment, the switch WP is turned on when the sound emission control signal CtS is at a high level and turned off when the sound emission control signal CtS is at a low level. When the switch WP is turned on, the drive signal Com-A supplied to the wire Lc1 is supplied to the upper electrode ZPu of the sound emitting element 57, and the sound emitting element 57 emits sound.

In the present embodiment, when the determination result information BB indicates that at least one of a hardware error, a temporary error, and a temperature abnormality occurs in the head module HM-C, the coupling state specifying circuit 560 causes the sound emitting element 57 to emit sound by setting the sound emission control signal CtS to a high level. On the other hand, when the determination result information BB indicates that none of the hardware error, the temporary error, and the temperature abnormality occurs in the head module HM-C, the coupling state specifying circuit 560 sets the sound emitting element 57 to a non-sound emitting state by setting the sound emission control signal CtS to a low level.

As illustrated in FIG. 16, the supply circuit 31C is different from the supply circuit 31 according to the first embodiment in that a coupling state specifying circuit 310C is provided, instead of the coupling state specifying circuit 310.

Here, when the determination result information BB indicates that none of the hardware error, the temporary error, and the temperature abnormality occurs in the head module HM-C, the coupling state specifying circuit 310C operates in the same manner as the coupling state specifying circuit 310. On the other hand, when the determination result information BB indicates that at least one of the hardware error, the temporary error, and the temperature abnormality occurs in the head module HM-C, the coupling state specifying circuit 310C sets the coupling state specifying signal Qa[m], the coupling state specifying signal Qb[m], and the coupling state specifying signal Qs[m] to a low level, and stops the drive of the piezoelectric element PZ by the drive signal Com.

As described above, according to the present embodiment, the piezoelectric element PZ and the sound emitting element 57 are exclusively driven by the drive signal Com generated by using the amplifier circuit 800 included in the drive signal generation circuit GR provided in the head unit 3C. Therefore, according to the present embodiment, it is possible to simplify the configuration of the head unit 3C as compared with the mode in which the circuit for driving the sound emitting element 57 is provided in the head unit 3C separately from the drive signal generation circuit GR for driving the piezoelectric element PZ.

Further, according to the present embodiment, the determination portion 40 is provided in the head unit 3C, and thus the determination portion 40 can accurately acquire the information indicating the state of the head unit 3C as compared with the mode in which the determination portion 40 is provided outside the head unit 3C, which makes it possible for the user of the head unit 3C to accurately recognize the defect of the head unit 3C.

Further, according to the present embodiment, the sound emitting portion 55 is provided in the head unit 3C, and thus the sound emitting portion 55 can reduce the possibility that noise is superimposed on the determination result information BB output from the determination portion 40 as compared with the mode in which the sound emitting portion 55 is provided outside the head unit 3C, which makes it possible for the user of the head unit 3C to accurately recognize the defect of the head unit 3C.

Further, according to the present embodiment, the determination portion 40 and the sound emitting portion 55 are provided in the head unit 3C, and thus it is possible for the user of the head unit 3C to accurately recognize the defect of the head unit 3C even if the wire coupled to the head unit 3C from the outside of the head unit 3C is defective and a signal cannot be supplied from the head unit 3C to the outside of the head unit 3C.

2.2. Structure of Ink Jet Printer

Hereinafter, an example of a structure of an ink jet printer 1C according to the second embodiment will be described with reference to FIG. 17.

Figure 17:
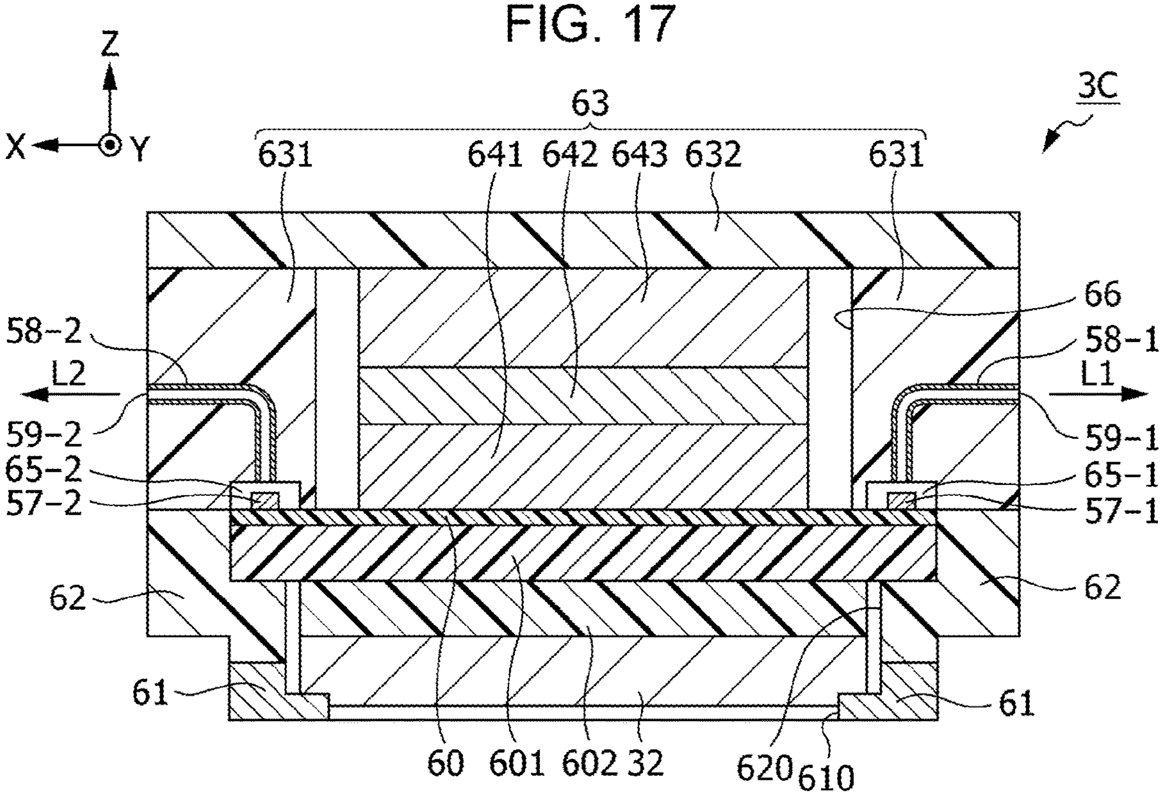
FIG. 17 is a cross-sectional view showing an example of a schematic structure of a head unit.

FIG. 17 is an example of a schematic partial cross-sectional view of the head unit 3C obtained by cutting the head unit 3C according to the present embodiment in a plane parallel to the XZ plane.

As illustrated in FIG. 17, the head unit 3C is different from the head unit 3 according to the first embodiment in that the head unit 3C includes a sound emitting element 57-1 and a sound emitting element 57-2 instead of the light emitting element 52-1 and the light emitting element 52-2, and includes a sound guide tube 58-1 and a sound guide tube 58-2 instead of the light guide tube 53-1 and the light guide tube 53-2.

Here, the sound guide tube 58-1 is a component that guides the sound emitted by the sound emitting element 57-1 to an opening 59-1.

Further, the opening 59-1 is an element for emitting the sound emitted from the sound emitting element 57-1 and guided by the sound guide tube 58-1 to the outside of the head unit 3C. In the present embodiment, the opening 59-1 is provided in a portion that can be visually recognized when the outer frame portion 631 is viewed in the +X direction. In this case, the sound guide tube 58-1 may be provided to couple the recess 65-1 to the opening 59-1 in the outer frame portion 631. However, the present embodiment is not limited to such a mode. For example, the opening 59-1 may be provided in a portion that can be visually recognized when the upper frame portion 632 is viewed in the +X direction. In this case, the sound guide tube 58-1 may be provided to couple the recess 65-1 to the opening 59-1 in the outer frame portion 631 and the upper frame portion 632. That is, the opening 59-1 may be provided in a side surface portion that can be visually recognized when the flow path member 63 is viewed in the +X direction. The opening 59-1 may be provided so that the sound emitting element 57-1 is located between the ejection head 32 and the opening 59-1 in the Z-axis direction.

In the present embodiment, the sound emitted from the opening 59-1 travels in the direction L1. However, the sound emitted from the opening 59-1 may travel to diffuse around the direction L1.

2.3. Summary of Second Embodiment

As described above, the head unit 3C according to the present embodiment may include the drive signal generation circuit GR that amplifies the input signal Aa to generate the drive signal Com, the ejection portion D having the piezoelectric element PZ driven by the drive signal Com and ejecting ink in response to the drive of the piezoelectric element PZ, the supply circuit 31 including the switch Wa for switching between supply and non-supply of the drive signal Com to the piezoelectric element PZ, and the sound emitting portion 55 that includes the sound emitting element 57 driven by the drive signal Com and the switch WP for switching between supply and non-supply of the drive signal Com to the sound emitting element 57 and emits sound in response to the drive of the sound emitting element 57, and the switch Wa and the switch WP are turned on exclusively.

As described above, according to the present embodiment, the piezoelectric element PZ and the sound emitting element 57 are exclusively driven by the drive signal Com generated by the drive signal generation circuit GR provided in the head unit 3C. Therefore, according to the present embodiment, it is possible to simplify the configuration of the head unit 3C as compared with the mode in which the circuit for driving the sound emitting element 57 is provided in the head unit 3C separately from the drive signal generation circuit GR for driving the piezoelectric element PZ.

Further, according to the present embodiment, the sound emitting element 57 is provided in the head unit 3, and thus it is possible to use the sound emitting element 57 to notify the user of the head unit 3 of a defect in the head unit 3 even if the wire coupled to the head unit 3 from the outside of the head unit 3 is defective and a signal cannot be supplied from the head unit 3 to the outside of the head unit 3.

Further, in the head unit 3C according to the present embodiment, the drive signal generation circuit GR may include the modulation circuit 801 that pulse-modulates the input signal Aa to generate the modulated signal Ms, the amplifier circuit 800 that amplifies the modulated signal Ms to generate the amplified signal Az, and the LPF 82 that smooths the amplified signal Az to generate the drive signal Com.

Further, the head unit 3C according to the present embodiment may include the determination portion 40 that determines the ejection state of the liquid from the ejection portion D, and the sound emitting portion 55 may emit sound according to the result of determination in the determination portion 40.

According to the present embodiment, the determination portion 40 is provided in the head unit 3C, and thus the determination portion 40 can accurately acquire the information indicating the state of the head unit 3C as compared with the mode in which the determination portion 40 is provided outside the head unit 3C, which makes it possible for the user of the head unit 3C to accurately recognize the defect of the head unit 3C.

Further, according to the present embodiment, the sound emitting portion 55 is provided in the head unit 3C, and thus the sound emitting portion 55 can reduce the possibility that noise is superimposed on the determination result information BB output from the determination portion 40 as compared with the mode in which the sound emitting portion 55 is provided outside the head unit 3C, which makes it possible for the user of the head unit 3C to accurately recognize the defect of the head unit 3C.

Further, according to the present embodiment, the determination portion 40 and the sound emitting portion 55 are provided in the head unit 3C, and thus it is possible for the user of the head unit 3C to accurately recognize the defect of the head unit 3C even if the wire coupled to the head unit 3C from the outside of the head unit 3C is defective and a signal cannot be supplied from the head unit 3C to the outside of the head unit 3C.

Further, in the head unit 3C according to the present embodiment, the piezoelectric element PZ may be a piezoelectric element.

Further, in the head unit 3C according to the present embodiment, the sound emitting element 57 may be a piezoelectric element.

Further, the head unit 3C according to the present embodiment may include the flow path member 63 provided with the liquid flow path for supplying ink to the ejection portion D, the ejection head 32 including the ejection portion D, the circuit board 60 including the switch Wa and disposed between the ejection head 32 and the flow path member 63, and the sound emitting element 57 may be provided between the flow path member 63 and the circuit board 60.

According to the present embodiment, the circuit board 60 is provided between the sound emitting element 57 and the ejection head 32, and thus the user of the head unit 3C can easily recognize the sound emitted by the sound emitting element 57 as compared with the mode in which the sound emitting element 57 is provided between the ejection head 32 and the circuit board 60.

Further, the head unit 3C according to the present embodiment may include the ejection head 32 having the piezoelectric element PZ driven by the drive signal Com and ejecting ink in response to the drive of the piezoelectric element PZ, the flow path member 63 provided with a liquid flow path for supplying ink to the ejection head 32, the circuit board 60 provided with the supply circuit 31C for supplying the drive signal Com to the piezoelectric element PZ and disposed between the ejection head 32 and the flow path member 63, and the sound emitting element 57 disposed between the circuit board 60 and the flow path member 63, and the flow path member 63 may be provided with the sound guide tube 58 that guides the sound emitted by the sound emitting element 57 to the outside of the flow path member 63.

According to the present embodiment, the sound guide tube 58 is provided in the flow path member 63, and thus the user of the head unit 3C can easily recognize the sound emitted by the sound emitting element 57 as compared with the embodiment in which the sound guide tube 58 is not provided in the flow path member 63.

Further, according to the present embodiment, the sound guide tube 58 is provided in the flow path member 63, and thus the user of the head unit 3C can recognize the sound emitted by the sound emitting element 57 without the restriction that the sound emitting element 57 is disposed to be exposed to the outside of the head unit 3C. That is, according to the present embodiment, it is possible to increase the degree of freedom in disposing the sound emitting element 57 without affecting the recognizability of the sound emitted by the sound emitting element 57 by the user of the head unit 3C.

Further, according to the present embodiment, the sound emitting element 57 is provided in the head unit 3C, and thus it is possible to use the sound emitting element 57 to notify the user of the head unit 3C of a defect in the head unit 3C even if the wire coupled to the head unit 3C from the outside of the head unit 3C is defective and a signal cannot be supplied from the head unit 3C to the outside of the head unit 3C.

Further, the head unit 3C according to the present embodiment may include the determination portion 40 that determines whether or not the error related to the head unit 3C or the wire coupled to the head unit 3C occurs, and the sound emitting element 57 may emit sound according to the result of determination in the determination portion 40.

According to the present embodiment, the determination portion 40 is provided in the head unit 3C, and thus the determination portion 40 can accurately acquire the information indicating the state of the head unit 3C as compared with the mode in which the determination portion 40 is provided outside the head unit 3C, which makes it possible for the user of the head unit 3C to accurately recognize the defect of the head unit 3C.

Further, according to the present embodiment, the sound emitting element 57 is provided in the head unit 3C, and thus the sound emitting element 57 can reduce the possibility that noise is superimposed on the determination result information BB output from the determination portion 40 as compared with the mode in which the sound emitting element 57 is provided outside the head unit 3C, which makes it possible for the user of the head unit 3C to accurately recognize the defect of the head unit 3C.

Further, according to the present embodiment, the determination portion 40 and the sound emitting element 57 are provided in the head unit 3C, and thus it is possible for the user of the head unit 3C to accurately recognize the defect of the head unit 3C even if the wire coupled to the head unit 3C from the outside of the head unit 3C are defective and a signal cannot be supplied from the head unit 3C to the outside of the head unit 3C.

Further, in the head unit 3C according to the present embodiment, the circuit board 60 may be made of a glass epoxy resin.

Further, in the head unit 3C according to the present embodiment, the flow path member 63 may be made of plastic.

Further, in the head unit 3C according to the present embodiment, the flow path member 63 may include a side surface portion, which is a visible portion when the flow path member 63 is viewed in a direction orthogonal to the ink ejection direction from the ejection head 32, and the sound guide tube 58 may guide the sound emitted by the sound emitting element 57 from the opening 59 provided in the side surface portion to the outside of the flow path member 63.

That is, in the present embodiment, the sound guide tube 58 guides the sound emitted by the sound emitting element 57 from the opening 59 provided in the side surface portion to the outside of the flow path member 63, and thus the user of the head unit 3C can easily recognize the sound emitted by the sound emitting element 57 as compared with the mode in which the sound emitted by the sound emitting element 57 is guided to the lower surface portion, which is a visible portion when the flow path member 63 is viewed in the direction opposite to the ink ejection direction from the ejection head 32.

Further, in the head unit 3C according to the present embodiment, the sound emitting element 57 may be provided at the end of the circuit board 60.

Therefore, according to the present embodiment, the user of the head unit 3C can easily recognize the sound emitted by the sound emitting element 57 as compared with the mode in which the sound emitting element 57 is provided in the central portion of the circuit board 60.

Further, in the head unit 3C according to the present embodiment, the sound emitting element 57 may be a piezoelectric element.

2.4. Modification Examples of Second Embodiment

The above embodiments can be modified in various ways. Specific modes of modification are illustrated below. In the modification examples illustrated below, elements whose actions and functions are the same as those of the embodiment will be denoted by the same reference numerals referred to in the above description, and detailed description thereof will be omitted as appropriate.

Modification Example 2.1

In the above-described embodiments, the sound guide tube 58 guides the sound emitted by the sound emitting element 57 from the opening 59 provided in the side surface portion of the flow path member 63 to the outside of the flow path member 63, but the present disclosure is not limited to the modes. For example, the sound guide tube may be provided such that the sound emitted by the sound emitting element 57 is guided from an opening provided in an upper portion, which is a portion that can be visually recognized when the flow path member 63 is viewed in the −Z direction, to the outside of the flow path member 63.

Figure 18:
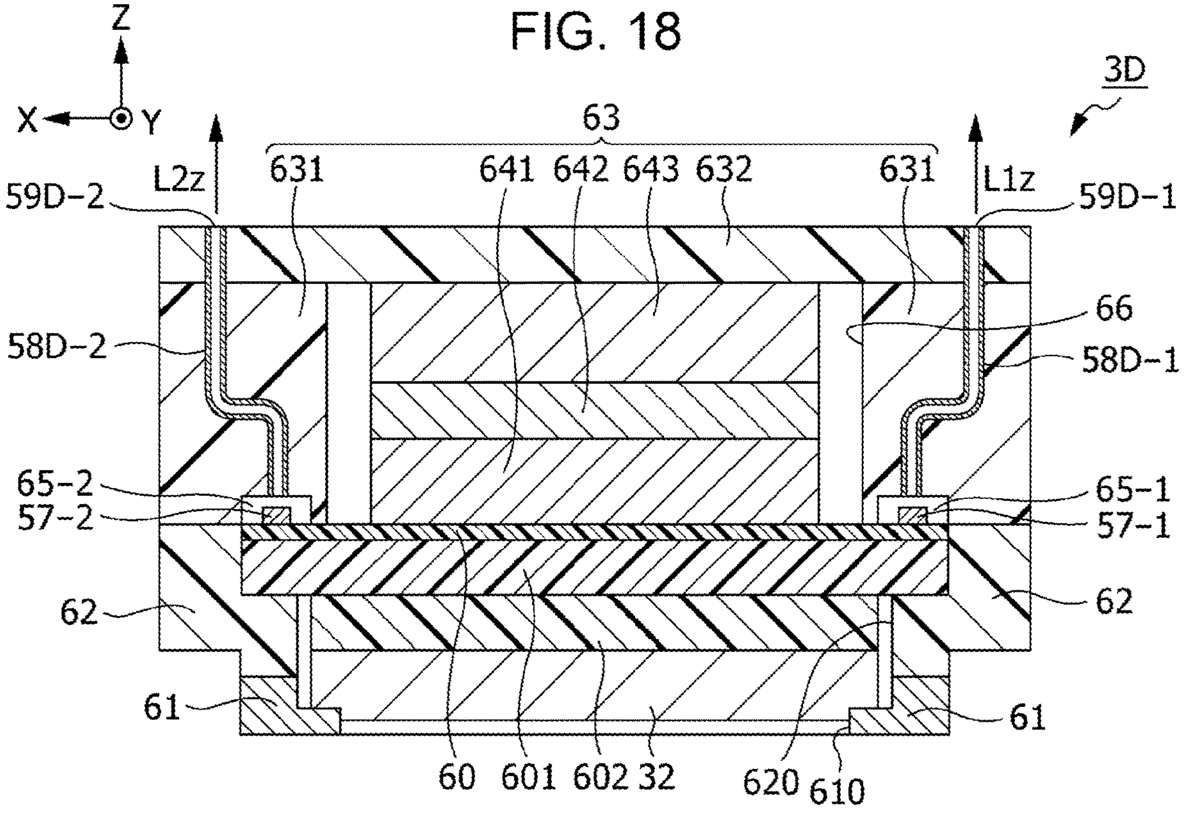
FIG. 18 is a cross-sectional view showing an example of a schematic structure of a head unit according to Modification Example 2.1.

FIG. 18 is an example of a schematic partial cross-sectional view of a head unit 3D obtained by cutting the head unit 3D according to the present modification example in a plane parallel to the XZ plane. The ink jet printer according to the present modification example is different from the ink jet printer 1C according to the second embodiment in that the head unit 3D is provided instead of the head unit 3C.

As illustrated in FIG. 18, the head unit 3D is different from the head unit 3C according to the second embodiment in that a sound guide tube 58D-1 and a sound guide tube 58D-2 are provided instead of the sound guide tube 58-1 and the sound guide tube 58-2.

Here, the sound guide tube 58D-1 is a component that guides the sound emitted by the sound emitting element 57-1 to the opening 59D-1.

Further, the opening 59D-1 is an element for emitting the sound emitted from the sound emitting element 57-1 and guided by the sound guide tube 58D-1 to the outside of the head unit 3D. In the present modification example, the opening 59D-1 is provided in a portion that can be visually recognized when the upper frame portion 632 is viewed in the −Z direction. In this case, the sound guide tube 58D-1 may be provided to couple the recess 65-1 to the opening 59D-1 in the outer frame portion 631 and the upper frame portion 632. However, the present modification example is not limited to such a mode. For example, the opening 59D-1 may be provided in a portion that can be visually recognized when the outer frame portion 631 is viewed in the −Z direction. In this case, the sound guide tube 58D-1 may be provided to couple the recess 65-1 to the opening 59D-1 in the outer frame portion 631. That is, the opening 59D-1 may be provided in the upper portion that can be visually recognized when the flow path member 63 is viewed in the −Z direction. The opening 59D-1 is provided so that the sound emitting element 57-1 is located between the ejection head 32 and the opening 59D-1 in the Z-axis direction.

In the present embodiment, the sound emitted from the opening 59D-1 travels in the direction L1*z*. However, the sound emitted from the opening 59D-1 may travel to diffuse around the direction L1*z*.

The sound guide tube 58D-2 is a component that guides the sound emitted by the sound emitting element 57-2 to the opening 59D-2.

Further, the opening 59D-2 is an element for emitting the sound emitted from the sound emitting element 57-2 and guided by the sound guide tube 58D-2 to the outside of the head unit 3D. In the present modification example, the opening 59D-2 is provided in a portion that can be visually recognized when the upper frame portion 632 is viewed in the −Z direction. In this case, the sound guide tube 58D-2 may be provided to couple the recess 65-2 to the opening 59D-2 in the outer frame portion 631 and the upper frame portion 632. However, the present modification example is not limited to such a mode. For example, the opening 59D-2 may be provided in a portion that can be visually recognized when the outer frame portion 631 is viewed in the −Z direction. In this case, the sound guide tube 58D-2 may be provided to couple the recess 65-2 to the opening 59D-2 in the outer frame portion 631. That is, the opening 59D-2 may be provided in the upper portion that can be visually recognized when the flow path member 63 is viewed in the −Z direction. The opening 59D-2 is provided so that the sound emitting element 57-2 is located between the ejection head 32 and the opening 59D-2 in the Z-axis direction.

In the present embodiment, the sound emitted from the opening 59D-2 travels in the direction L2*z*. However, the sound emitted from the opening 59D-2 may travel to diffuse around the direction L2*z*.

Further, in the present embodiment, the opening 59D-1 and the opening 59D-2 are examples of the "upper opening".

As described above, in the head unit 3D according to the present modification example, the flow path member 63 may include an upper portion, which is a visible portion when the flow path member 63 is viewed in the −Z direction that is the ink ejection direction from the ejection head 32, and the sound guide tube 58D may guide the sound emitted by the sound emitting element 57 from the opening 59D provided in the upper portion to the outside of the flow path member 63.

That is, in the present modification example, the sound guide tube 58D guides the sound emitted by the sound emitting element 57 from the opening 59D provided in the upper portion to the outside of the flow path member 63, and thus the user of the head unit 3D can easily recognize the sound emitted by the sound emitting element 57 compared with the mode in which the sound emitted by the sound emitting element 57 is guided to the lower surface portion.

3. Other Modification Examples

Each of the above illustrated embodiments can be modified in various ways. Specific modes of modification are illustrated below. Any two or more modes selected from the following examples can be appropriately merged within the extent that they do not contradict each other. For the elements of which actions and functions are the same as those of the embodiments in modification examples illustrated below, the reference numerals referred to in the above description will be used and detailed description of each will be omitted as appropriate.

Modification Example 3.1

In the above-described embodiments and modification examples, the ink jet printer is illustrated as a serial printer, but the present disclosure is not limited to such a mode. The ink jet printer may be a so-called line printer in which a plurality of nozzles N are provided to extend wider than the width of the recording paper P in the head unit.

Modification Example 3.2

In the above-described embodiments and modification examples, the ink jet printer ejects ink from the nozzles N by vibrating the piezoelectric elements PZ, but the present disclosure is not limited thereto; for example, a so-called thermal method may be used that generates air bubbles in the cavity 322 by heat generated from a heating element provided in the cavity 322 to increase the pressure inside the cavity 322, thereby ejecting ink.

What is claimed is:

1. A print head comprising:

a generation portion that amplifies an input signal to generate a drive signal;

an ejection portion that includes a first driving element driven by the drive signal and ejects a liquid in response to the drive of the first driving element;

a supply portion that includes a first switch for switching between supply and non-supply of the drive signal to the first driving element; and a sound emitting portion that includes a second driving element driven by the drive signal and a second switch for switching between supply and non-supply of the drive signal to the second driving element, the sound emitting portion emitting sound in response to the drive of the second driving element, thereby notifying a user of the sound;

a flow path member provided with a liquid flow path for supplying a liquid to the ejection portion;

a head portion provided with the ejection portion; and a circuit board provided with the first switch and disposed between the head portion and the flow path member, wherein the first switch and the second switch are turned on exclusively, and the second driving element is provided between the flow path member and the circuit board.

2. The print head according to claim 1, wherein the generation portion includes a modification circuit that pulse-modulates the input signal to generate a modulated signal, an amplifier circuit that amplifies the modulated signal to generate an amplified signal, and a smoothing circuit that smooths the amplified signal to generate the drive signal.

3. The print head according to claim 1, further comprising a determination portion that determines a liquid ejection state from the ejection portion, wherein the sound emitting portion emits sound according to a result of determination in the determination portion.

4. The print head according to claim 1, wherein the first driving element is a piezoelectric element.

5. The print head according to claim 1, wherein the second driving element is a piezoelectric element.

* * * * *